US008694143B2

(12) United States Patent
Sawayanagi et al.

(10) Patent No.: US 8,694,143 B2
(45) Date of Patent: Apr. 8, 2014

(54) APPARATUS AND METHOD FOR MANAGING SUCCESSIVE JOBS IN DEVICES IN A NETWORK

(75) Inventors: Kazumi Sawayanagi, Itami (JP); Hironobu Nakata, Itami (JP); Masakazu Murakami, Itami (JP); Minako Kobayashi, Ikeda (JP)

(73) Assignee: Konica Minolta Business Technologies, Inc., Marunouchi, Chiyoda-ku (JP)

( * ) Notice: Subject to any disclaimer, the term of this patent is extended or adjusted under 35 U.S.C. 154(b) by 841 days.

(21) Appl. No.: 11/239,370

(22) Filed: Sep. 30, 2005

(65) Prior Publication Data

US 2007/0013943 A1   Jan. 18, 2007

(30) Foreign Application Priority Data

Jul. 14, 2005   (JP) ................................. 2005-205569

(51) Int. Cl.
| | |
|---|---|
| G06F 19/00 | (2011.01) |
| G06F 9/44 | (2006.01) |
| G06F 3/12 | (2006.01) |
| H04N 1/00 | (2006.01) |
| G06Q 10/00 | (2012.01) |
| G06F 7/60 | (2006.01) |
| G06G 7/48 | (2006.01) |

(52) U.S. Cl.
USPC .......... 700/100; 717/103; 717/107; 358/1.15; 358/402; 705/7.11; 703/2; 703/6

(58) Field of Classification Search
CPC ...... G06Q 10/06; G06F 3/1275; G06F 3/1296
USPC .......... 717/103–107; 358/1.15, 402; 705/7, 8, 705/7.11, 7.12; 703/2, 6; 700/100
See application file for complete search history.

(56) References Cited

U.S. PATENT DOCUMENTS

| | | | |
|---|---|---|---|
| 6,104,468 A | | 8/2000 | Bryniarski et al. |
| 6,546,364 B1 * | | 4/2003 | Smirnov et al. .................. 703/22 |
| 7,125,179 B1 * | | 10/2006 | Rai et al. .......................... 400/62 |

(Continued)

FOREIGN PATENT DOCUMENTS

| | | |
|---|---|---|
| EP | 2116929 A1 * | 11/2009 |
| JP | 10-254958 A | 9/1998 |

(Continued)

OTHER PUBLICATIONS

Decision of Refusal in JP 2000-524743 dated Nov. 18, 2008, and an English Translation thereof.

(Continued)

Primary Examiner — Darrin Dunn
(74) Attorney, Agent, or Firm — Buchanan Ingersoll & Rooney PC

(57) ABSTRACT

In a management apparatus for managing a flow of linked jobs to be executed by a plurality of devices connected to a network, a storage device stores one or more flows. When a change of function in the devices is detected, one of the one or more flows stored in the storage device and affected by the change of function detected by the detector is corrected. Then the corrected flow is stored in the storage device. Alternatively, the corrected flow is presented to a user who owns the one of the one or more flows.

17 Claims, 22 Drawing Sheets

(56) References Cited

U.S. PATENT DOCUMENTS

| | | | |
|---|---|---|---|
| 2002/0129081 A1* | 9/2002 | Rai et al. | 709/102 |
| 2003/0149747 A1* | 8/2003 | Rai et al. | 709/219 |
| 2003/0188051 A1* | 10/2003 | Hawkins et al. | 710/15 |
| 2004/0034543 A1* | 2/2004 | Bartsch | 705/1 |
| 2004/0057065 A1 | 3/2004 | Michimura et al. | |
| 2004/0059716 A1 | 3/2004 | Shiraishi et al. | |
| 2004/0061891 A1* | 4/2004 | Philpot | 358/1.15 |
| 2004/0085562 A1* | 5/2004 | Fromherz | 358/1.13 |
| 2004/0103014 A1* | 5/2004 | Teegan et al. | 705/8 |
| 2004/0111430 A1 | 6/2004 | Hertling et al. | |
| 2004/0181593 A1* | 9/2004 | Kanojia et al. | 709/220 |
| 2004/0193717 A1 | 9/2004 | Tajima et al. | |
| 2005/0027825 A1 | 2/2005 | Hikawa et al. | |
| 2005/0065830 A1* | 3/2005 | Duke et al. | 705/7 |
| 2005/0151993 A1* | 7/2005 | Gartstein et al. | 358/1.15 |
| 2005/0202390 A1* | 9/2005 | Allen et al. | 434/353 |
| 2005/0248804 A1* | 11/2005 | Goel et al. | 358/1.15 |
| 2005/0275881 A1* | 12/2005 | Akashi et al. | 358/1.15 |
| 2006/0044597 A1* | 3/2006 | Dumitrescu et al. | 358/1.15 |
| 2006/0053023 A1* | 3/2006 | Matsunaga et al. | 705/1 |
| 2006/0080616 A1* | 4/2006 | Vogel et al. | 715/769 |
| 2006/0242097 A1* | 10/2006 | Gu et al. | 706/45 |
| 2006/0265201 A1* | 11/2006 | Martin | 703/6 |
| 2007/0002085 A1* | 1/2007 | Sampath et al. | 347/5 |
| 2008/0259711 A1* | 10/2008 | Shipton et al. | 365/226 |

FOREIGN PATENT DOCUMENTS

| | | |
|---|---|---|
| JP | 2000-049990 | 2/2000 |
| JP | 2000-341455 | 12/2000 |
| JP | 2001-249792 | 9/2001 |
| JP | 2003-179983 A | 6/2003 |
| JP | 2003-233473 | 8/2003 |
| JP | 2003-345954 | 12/2003 |
| JP | 2004-133926 | 4/2004 |
| JP | 2004-163997 A | 6/2004 |
| JP | 2004-164313 | 6/2004 |
| JP | 2004-164313 A | 6/2004 |
| JP | 2004-206694 | 7/2004 |
| JP | 2004-280665 | 10/2004 |
| JP | 2004-287681 | 10/2004 |
| JP | 2004-287861 | 10/2004 |
| JP | 2004-287862 | 10/2004 |

OTHER PUBLICATIONS

Japanese Patent Office Notification of Reasons of Refusal for Japanese Patent Application No. 2005-205569, dated Oct. 16, 2007, and English translation thereof.

* cited by examiner

Fig.4

HOLDING FUNCTION TABLE
◆ SINGLE SIDE PRINT FUNCTION
　PARAMETERS:RESOLUTION:600dpi,300dpi PRINT SPEED:30PPM COLOR:COLOR, MONOCHROME, MONOCOLOR
◆ DOUBLE SIDE PRINT FUNCTION
　PARAMETERS:RESOLUTION:600dpi,300dpi DOUBLE SIDE PRINT SPEED:15PPM COLOR:COLOR, MONOCHROME, MONOCOLOR
◆ PCL PRINT FUNCTION
　PARAMETERS:VERSION 6c COMPATIBLE
◆ SECURE PRINT FUNCTION
　PARAMETERS:SECURITY LEVEL:LEVEL 3 SECURE PRINT SPEED:15PPM
◆ STAPLE FUNCTION
　PARAMETERS:1-POINT STAPLE, 2-POINT STAPLE, CENTER-STAPLE
◆ PUNCH FUNCTION
　PARAMETERS:2-HOLE PUNCH, 3-HOLE PUNCH, 4-HOLE PUNCH
◆ FOLD FUNCTION
　PARAMETERS:FOLD IN TWO, FOLD IN THREE, Z FOLD
◆ SINGLE SIDE SCAN FUNCTION
　PARAMETERS:RESOLUTION:1200dpi,600dpi,300dpi SCAN SPEED:30PPM
◆ DOUBLE SIDE SCAN FUNCTION
　PARAMETERS:RESOLUTION:1200dpi,600dpi,300dpi SCAN SPEED:30PPM
◆ PDF CREATE FUNCTION
　PARAMETERS:CREATE SECURITY PDF:POSSIBLE, CREATE SPEED:3sec
◆ DISPLAY PANEL
　PARAMETERS:SCREEN SIZE:640×240 COLOR PANEL:MONOCHROMATIC
◆ DIGITAL CAMERA DIRECT PRINT
　PARAMETERS:COMPATIBLE STANDARD:PictBridgeV1.0

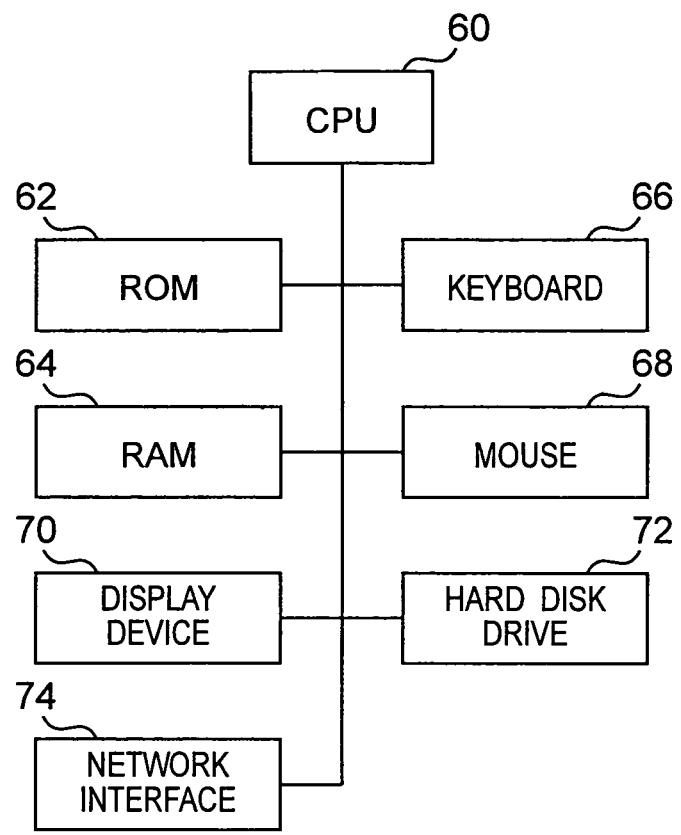

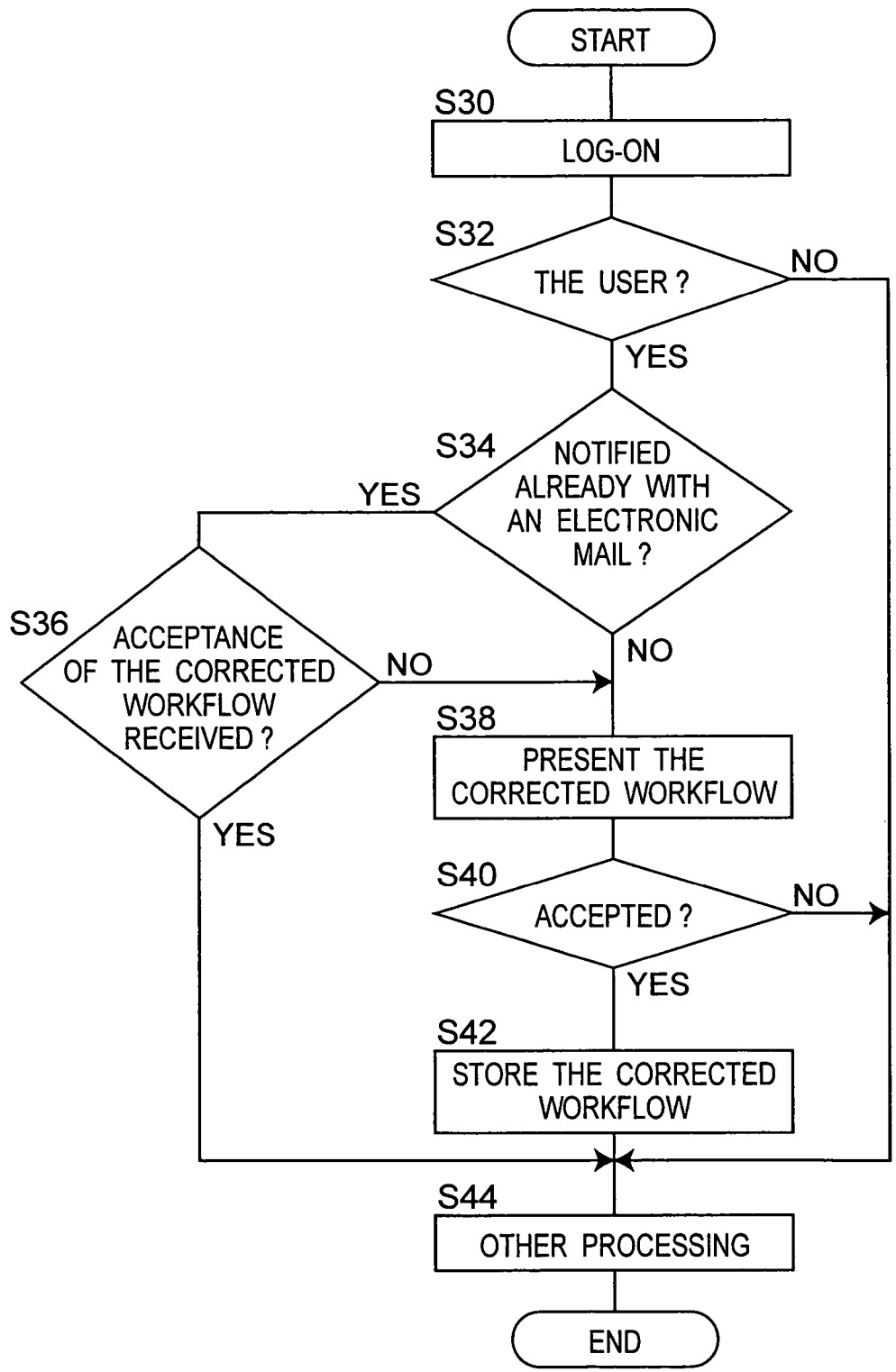

Fig.10

WORKFLOW NAME : workA
ADMINISTRATOR : user01
WORKFLOW PROCESSING TIME:38.5s

- COMMON INFORMATION
→No : 001
→RUN MACHINE INFORMATION:MFP1(192.168.0.50)
→RUN APPLICATION:Scan
→PREVIOUS JOB No:None
→NEXT JOB No:002
→AVERAGE PROCESSING TIME:3.5s
→AVERAGE WAIT TIME:0.0s
- APPLICATION INFORMATION (Scan)
→COLOR INFORMATION:FULL COLOR
→IMAGE RESOLUTION:600dpi
→COMPRESSION METHOD:PDF
→STORED SITE:¥¥MFP1¥box¥user01

- COMMON INFORMATION
→No : 002
→RUN MACHINE INFORMATION:MFP1(192.168.0.50)
→RUN APPLICATION:OCR
→PREVIOUS JOB No:1
→NEXT JOB No:003
→AVERAGE PROCESSING TIME:5s
→AVERAGE WAIT TIME:3.5s
- APPLICATION INFORMATION (OCR)
→EMBED SENTENCE:YES
→OBJECT FILE OF OCR:¥¥MFP1¥box¥ScanData.pdf
→STORED SITE:¥¥Server02¥work¥

- COMMON INFORMATION
→No : 003
→RUN MACHINE INFORMATION:Server2(192.168.0.200)
→RUN APPLICATION:WWW REGISTRATION
→PREVIOUS JOB No:1,2
→NEXT JOB No:None
→AVERAGE PROCESSING TIME:30s
→AVERAGE WAIT TIME:8.5s
- APPLICATION INFORMATION (WWW REGISTRATION)
→REGISTERED FILE:¥¥Server02¥work¥ScanData.pdf
→STORED SITE:¥¥Server02¥WWW¥user01

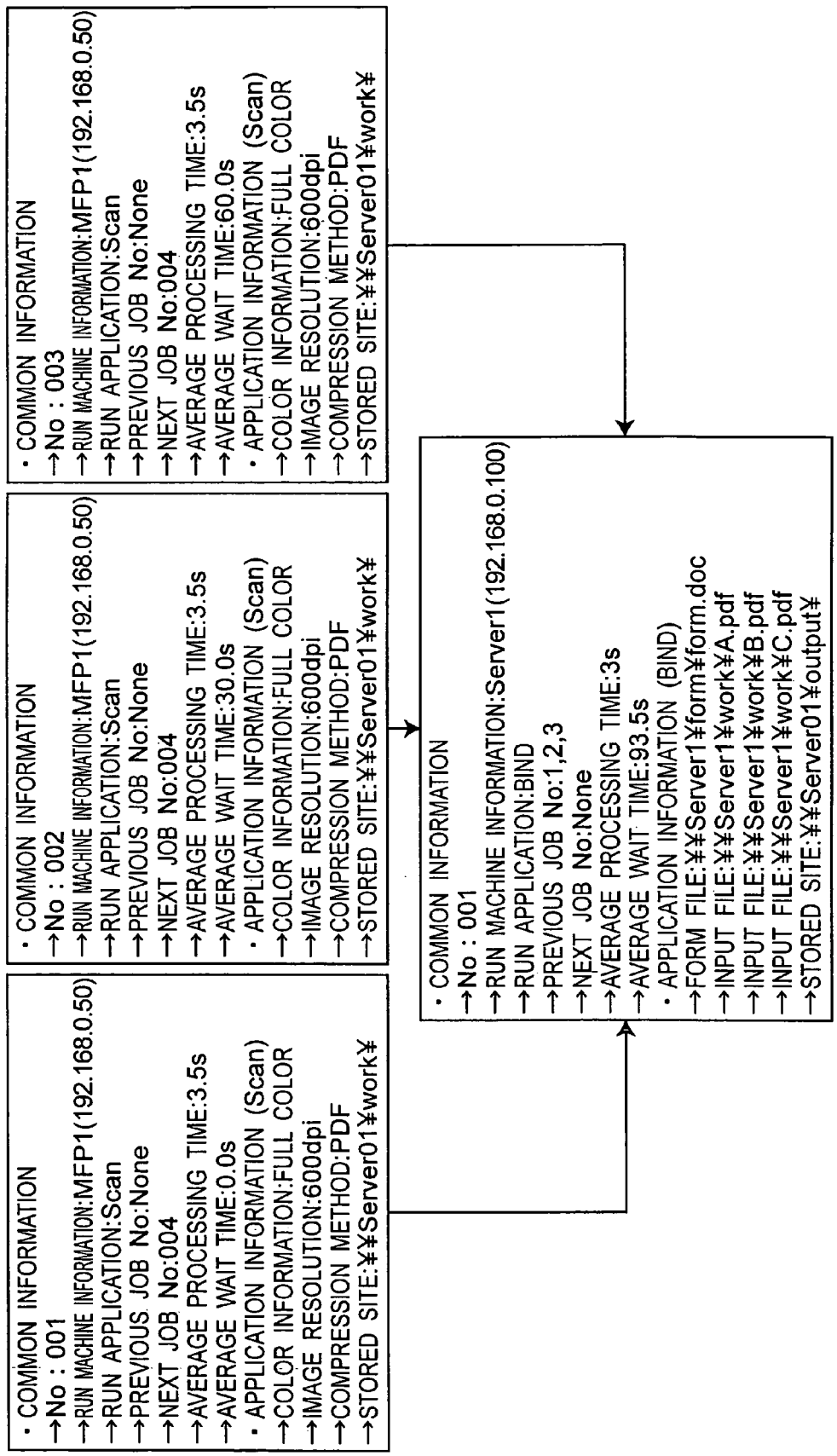

Fig. 19

| No. | PROPOSAL FOR CORRECTED JOB SCENARIO |
|---|---|
| | JOB SCENARIO NAME |
| 001 | Web REGISTRATION OF REPORT |
| 002 | FAX TRANSMISSION OF REPORT |

← →

RETURN

US 8,694,143 B2

APPARATUS AND METHOD FOR MANAGING SUCCESSIVE JOBS IN DEVICES IN A NETWORK

This application is based on application No. 2005-205569 filed in Japan, the contents of which are hereby incorporated by reference.

BACKGROUND OF THE INVENTION

1. Field of the Invention

The present invention relates to an operation of jobs linked to be executed by a plurality of devices connected to a network.

2. Description of Prior Art

In an office environment, various devices such as a multifunctional peripheral (MFP), a printer and a server are connected to a network. They are shared, and a user in a device connected to the network can instruct a job to another device in the network. Further, jobs for devices connected to the network are sometimes linked to be executed for example successively. Then, a function for instructing such a linked operation of jobs is equipped in a device. The contents of such a linked operation is called job scenario, and a concrete flow of linked jobs is called a workflow.

In a workflow, devices to run the jobs described in a job scenario are specified in order to realize the linked operation. For example, in an image processing system described in Japanese Patent laid open Publication 2000-341455, capabilities possessed by the devices to be used in a linked operation are acquired and stored. When a linked operation is set, it is presented for a user, who can select devices easily and surely for executing the desired linked operation.

When a workflow using a plurality of devices in a network is stored, it can be executed easily, if necessary, by reading it. However, it may happen that a function of a device used in a workflow is changed. As to a multifunctional peripheral, for example, a function such as double-side printing is added, or an application program such as optical character recognition, image processing or file format conversion is added, or a version update of a function equipped therein occurs. In a system described in Japanese Patent laid open Publication 2000-341455, possessing capabilities of devices used for a linked operation are stored. However, if one of the functions in the devices is changed, a workflow related thereto may not be used. Therefore, it is desirable to make it easy to reflect a change in the functions of the devices in workflows easily.

SUMMARY OF THE INVENTION

An object of the invention is to improve a linked operation of devices in a network easily when a function to be executed by the devices is changed.

In one aspect of the present invention, a management apparatus manages a flow of linked jobs to be executed by a plurality of devices connected to a network. The management apparatus includes a storage device which stores one or more flows, a detector which detects a change of function in the devices, and a corrector which corrects one of the one or more flows stored in the storage device affected by the change of function detected by the detector. The storage device stores the corrected flow.

In another aspect of the present invention, the management apparatus includes a storage device which stores one or more flows, a detector which detects a change of function in the devices, a corrector which corrects one of the one or more flows stored in the storage device affected by the detected change of function, and a presenter which presents the corrected flow to a user who owns the one of the one or more flows.

An advantage of the present invention is that a flow for executing linked jobs can be corrected easily according to a change of function equipped in the devices, without laying a burden to an administrator or a user who owns the flow.

BRIEF DESCRIPTION OF THE DRAWINGS

These and other objects and features of the present invention will become clear from the following description taken in conjunction with the preferred embodiments thereof with reference to the accompanying drawings, and in which:

FIG. 4 is a diagram of a holding function table;

FIG. 5 is a block diagram of a server apparatus;

FIG. 9 is a flowchart for presenting a corrected workflow;

FIG. 10 is a diagram of an example of a workflow to be presented to a user;

FIG. 11 is a diagram of another example of a workflow;

FIG. 19 is a diagram of a screen for displaying a workflow;

DETAILED DESCRIPTION OF THE PREFERRED EMBODIMENTS

Figure 1:
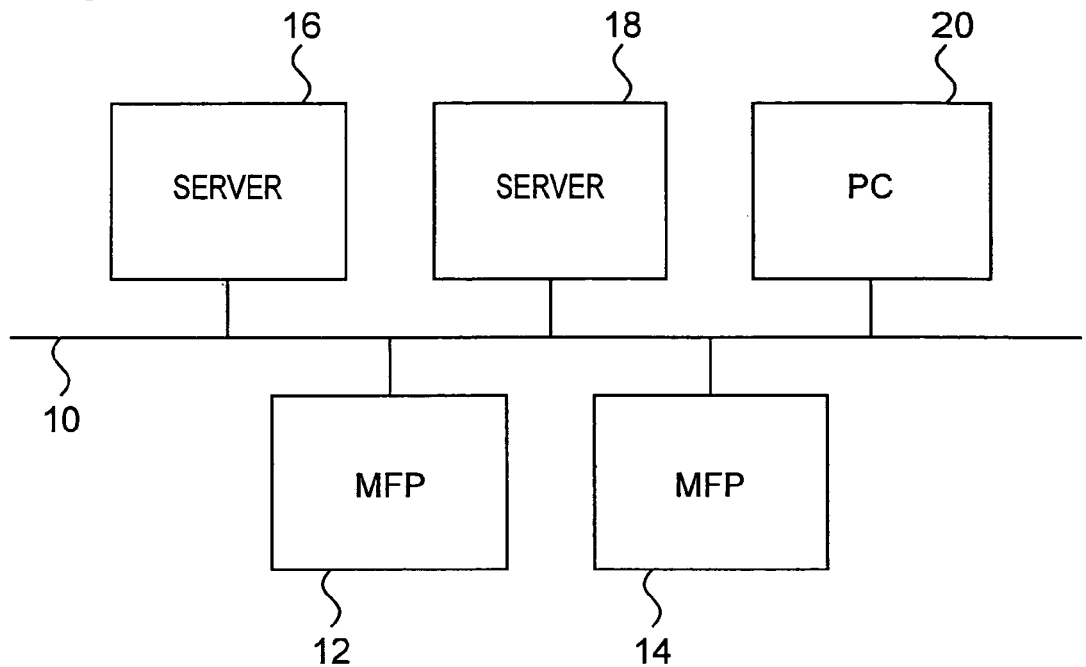
FIG. 1 is a diagram of an example of a network system.

Referring now to the drawings, wherein like reference characters designate like or corresponding parts throughout the several views, FIG. 1 shows an example of a network system. In the network, a plurality of multifunctional peripherals (MFPs) 12, 14, a plurality of server apparatuses 16, 18 and a plurality of computers (PCs) 20 are connected to a local area network which uses an Ethernet. The multifunctional peripheral 12, 14 has many functions such as scan, print and copy. The server apparatus 16 is operated as a file server and as an optical character recognition (OCR) server, while the server apparatus 18 is operated as a web server. Further, the computer 20 has an environment wherein a user can use application programs.

Figure 2:
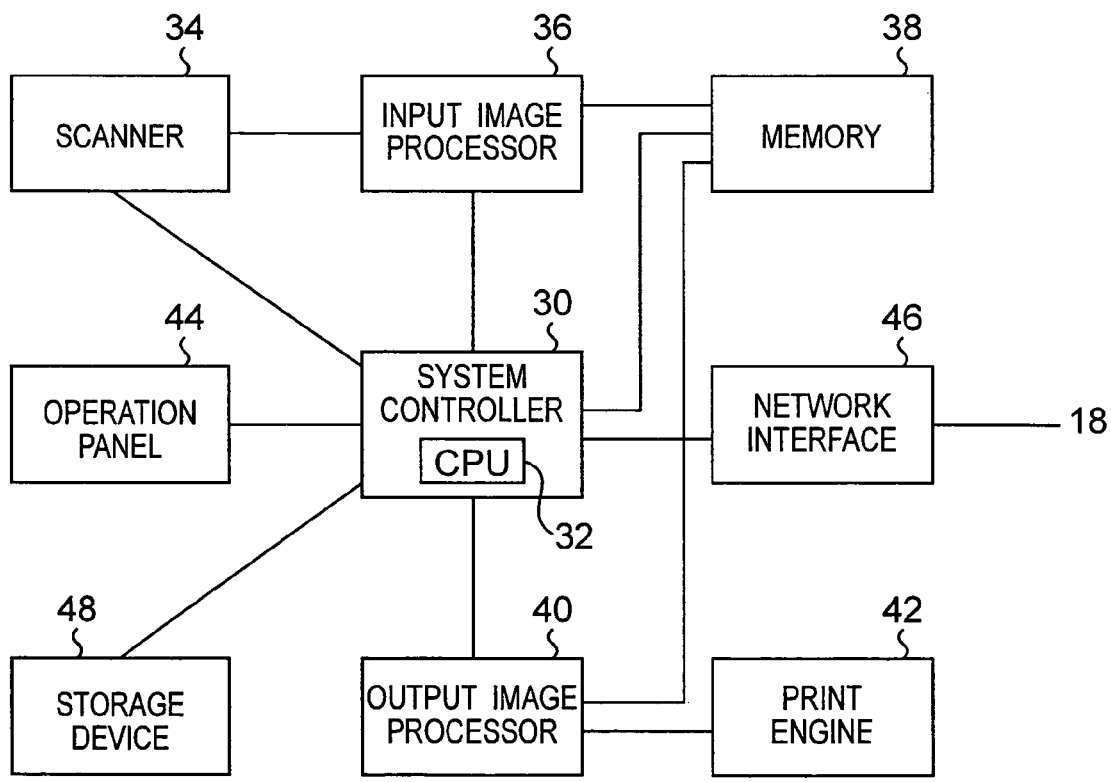
FIG. 2 is a block diagram of a multi-functional peripheral.

FIG. 2 shows the structure of the multifunctional peripheral 12, 14, wherein a system controller 30 has a central processing unit (CPU) 32 for controlling the entire multifunctional peripheral. The system controller 30 is connected to a scanner 34 for reading an image of a document or the like, an input image processor 36 for processing input image data, a storage device 38 for storing images, an output image processor 40 for processing image data to produce print data, a print engine 42 for printing the print data on a sheet of paper, an operation panel 44 for operations and display, a network controller 46 for transmission with an external network, and a storage device 48 of a large storage capacity such as a hard disk drive. When the multifunctional peripheral is operated as a printer, the image is printed with the print engine 42. When it is operated as a copying machine, an image is read with the scanner 34 and is printed with the print engine 42. In the operation panel 44, various instructions and data inputs are received, and various screens are shown.

Each of the multifunctional peripherals 12, 14 can store and manage workflows. A workflow denotes a flow of linked jobs to be executed by devices connected via the network. Workflows are stored in the storage device 48. When a workflow is stored, it can be used again later. When a capability or function of a device is changed, the stored workflows may be affected. In this invention, when a function of a device is changed, it is proposed to correct or reconstruct the workflows if necessary. For this purpose, in the processing of linked jobs or workflows, the system controller 30 detects that a new device is added to the network or a function of at least one device is changed. (Hereinafter, the change of function includes improvement of a function due to version upgrade and addition of a new function.) Then, according to the detected change of function, it is decided whether a workflow relevant to the function can be corrected or not. If it is decided that the workflow can be corrected, the workflow is processed appropriately. Then, for example, the corrected workflow is stored. Preferably, user's advantage of the correction over the current workflow is estimated, and if the corrected workflow is decided to have an advantage, it is stored instead of the current workflow. Then, as to a workflow affected by the change of function, when it is used next time, the corrected workflow can be used. Alternatively, if it is decided that the current workflow can be improved, it is notified to a user who owns the workflow, to propose the change in the workflow. Then, if the user or the administrator accepts the corrected workflow, it is stored. The latter approach is explained mainly hereinafter.

Figure 3:
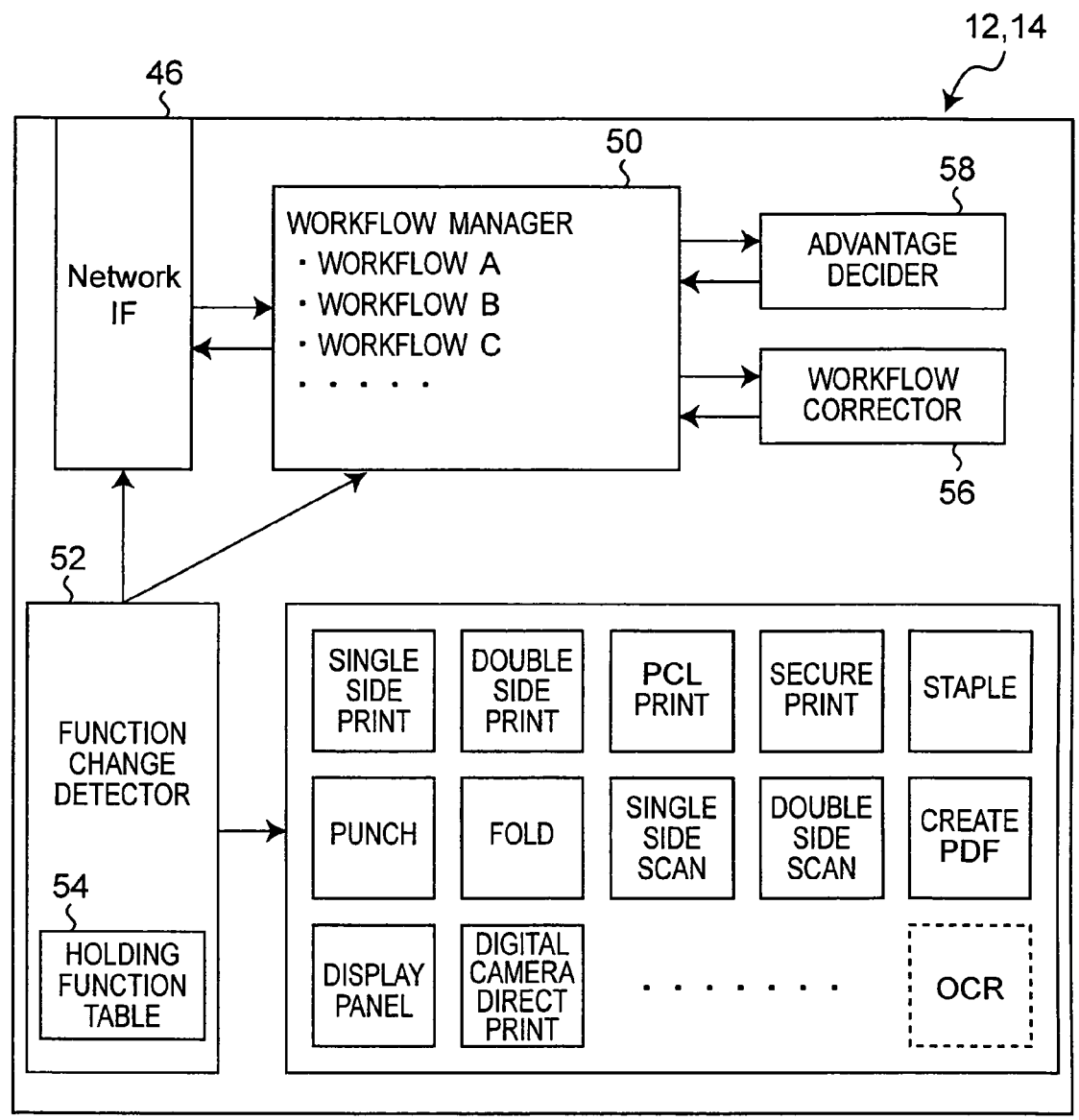
FIG. 3 is a diagram of functional blocks of a system controller relevant to a workflow.

FIG. 3 is a diagram of functional blocks relevant to the processing of workflows by a system controller 30 of the multifunctional peripheral 12, 14. A workflow manager 50 manages workflows registered in the multifunctional peripheral. A function change detector 52 acquires functions possessed in the multifunctional peripheral and parameters thereof (as shown in the right bottom side in FIG. 3) periodically, for example, on the start-up of the system when an electric power is turned on or on a restart, and they are stored in a holding-function table 54 (refer to FIG. 4) provided in the storage device 48. (In the example shown in FIGS. 3 and 4, the optical character recognition function is not held.) Then the acquired functions are checked for comparison with the contents stored until now in the table 54. If any difference is found (for example, if a function of optical character recognition is added), it is decided that a change of function is found, and the changed function and the parameters thereof are notified to the workflow manager 50. Further, the manager 50 notifies the changed function and the parameters thereof via the network interface 46 to workflow managers in the other devices. On the other hand, it is notified from workflow managers in the other devices that a new device is added to the network or a function change happens in the external devices. The workflow corrector 56 decides whether the managed workflows can be corrected or reconstructed when the changed function and the parameters thereof are detected or notified. An advantage decider 58 estimates user's advantage of the reconstructed workflow over the current workflows. Then the workflow manager 50 notifies the result of the estimation to the user who possesses the workflow and proposes the corrected workflow. Alternatively, in a modified embodiment, the corrected workflow is stored in the workflow manager.

FIG. 5 is a block diagram of the server 16, 18. A central processing unit (CPU) 60 which controls the entire server is connected to a random access memory (ROM) 62 for storing programs and data, a keyboard 66 and a mouth 68 used as input devices, a display device 70, a storage device such as a hard disk drive 72 having a large storage capacity, and a network interface 74 for communication via a network. The server 16 used as an OCR server stores an OCR program. The personal computer 20 also has a similar structure, but its explanation is omitted here for preventing duplicated explanation.

Figure 6:
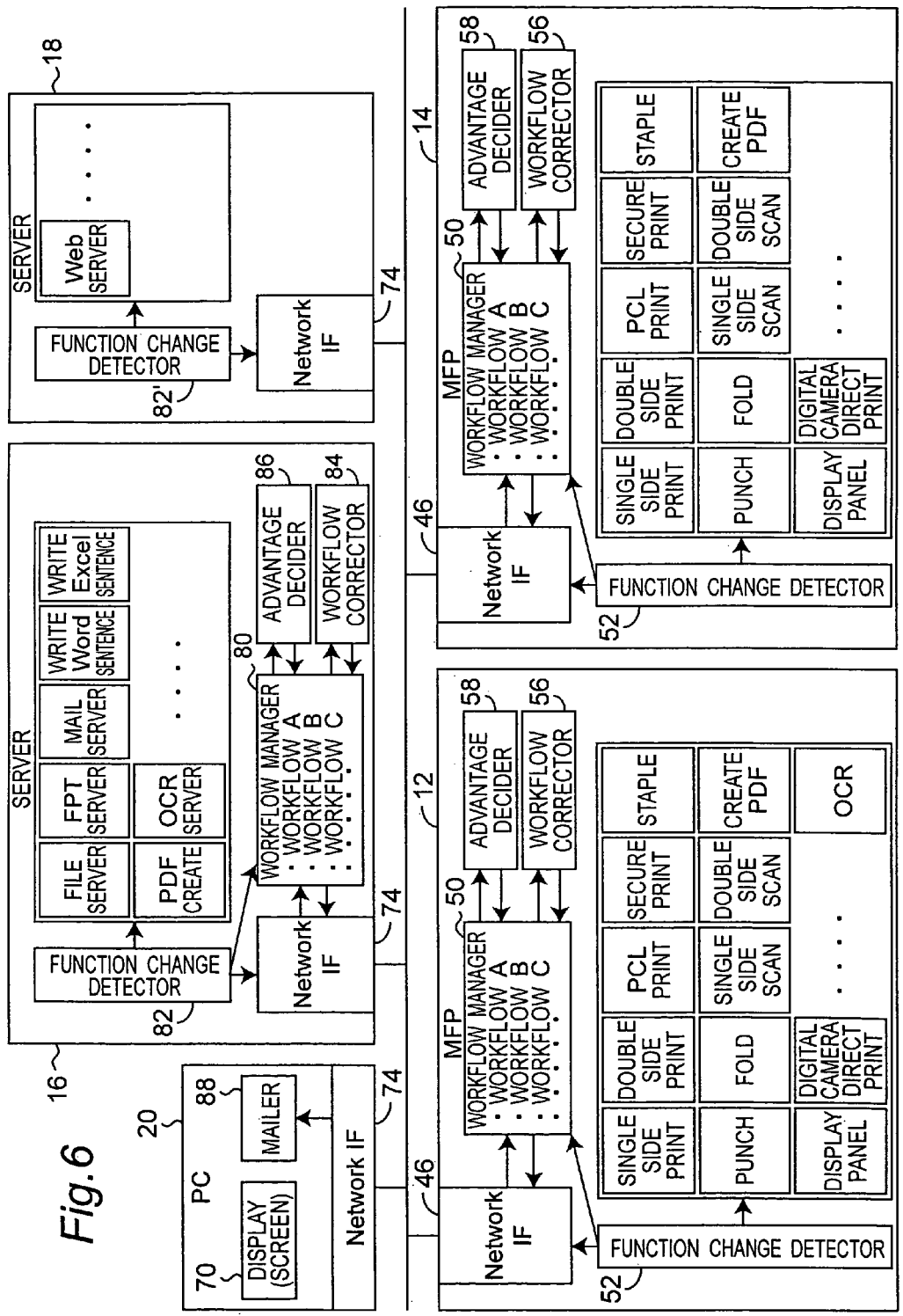
FIG. 6 is a block diagram on workflow management in a network including multi-functional peripherals, servers and a personal computer.

FIG. 6 shows a control block diagram on the workflow management in the network system including the multifunctional peripherals 12, 14, the server apparatuses 16, 18 and the personal computer 20. The structures of the multifunctional peripherals 12, 14 are similar to that shown in FIG. 3. The server apparatus 16 operated as a file server and as an OCR server has a workflow manager 80, a function change detector 82, a workflow corrector 84, a run advantage decider 86 and a network interface 74, similarly to the multifunctional peripherals 12, 14. The server apparatus 18 operated as a web server has a function change detector 82' and a network interface 74. Further, the personal computer 20 has a display device 70, a mailer 88 as an application for electronic mail and a network interface 74. The work flow manager 80, function change detector 82, the workflow corrector 84 and the run advantage decider 86 to be executed by the CPU 60 are operated similarly to the workflow manager 50, the function change detector 52, the workflow corrector 56, an advantage decider 58 in the multifunctional peripheral 12, 14.

Figure 7:
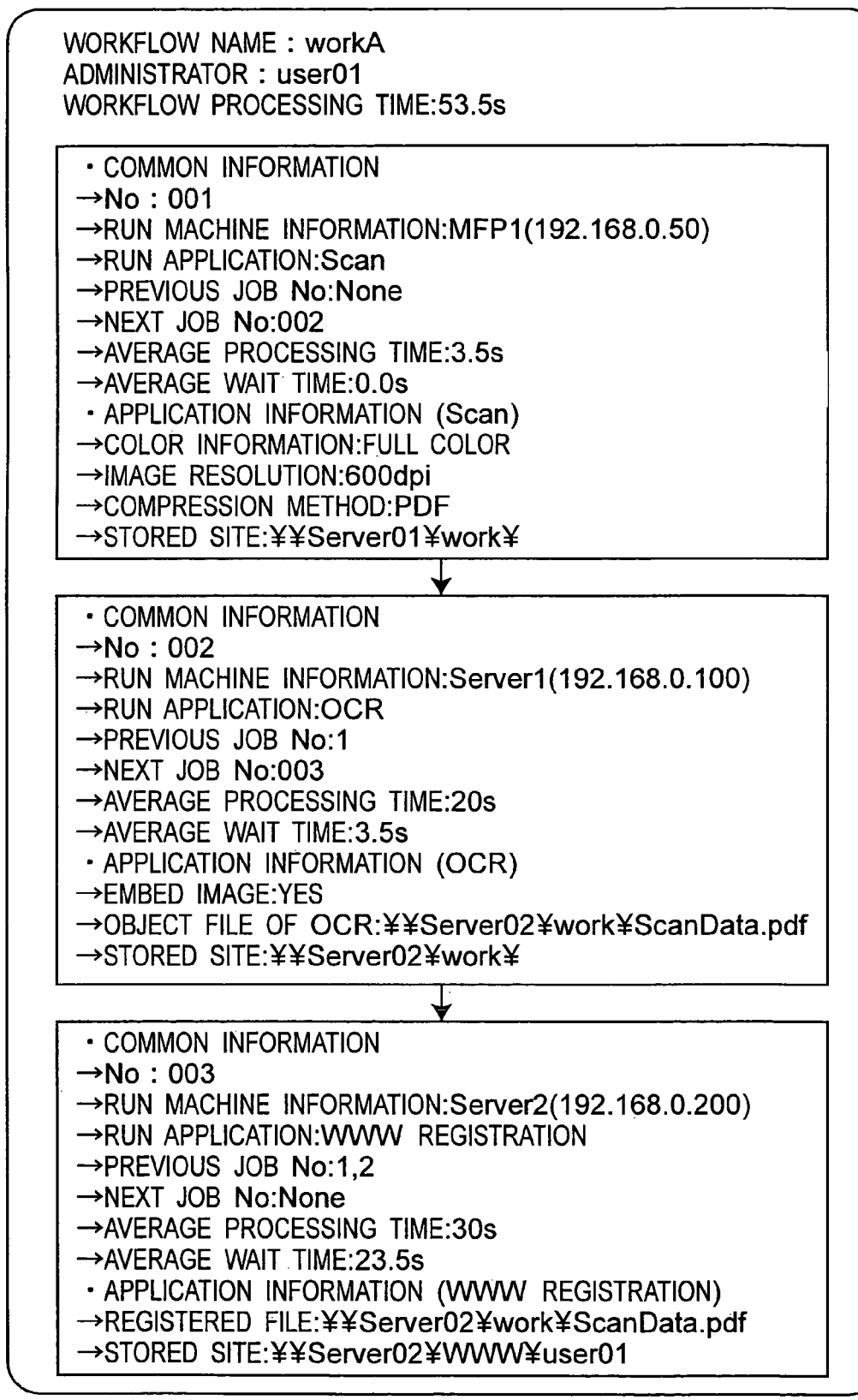
FIG. 7 is a diagram of an example of a workflow.

FIG. 7 shows an example of a workflow managed by the workflow manager 50. A workflow includes parameters of workflow name, manager name and processing time for the workflow. Further, each job included in a workflow has two kinds of parameters of common information and application information. The common information represents information common in the jobs in the workflow. For example, it includes a number (sequential number of the job), execution machine information (machine name and its Internet Protocol address), application to be executed (scan, OCR or the like), previous job number(s) (sequential number(s) of the job(s) to be run just before the current job), next job number(s) (sequential number(s) of the job(s) to be run just after the current job), average processing time (average time of the execution of the job), and an average wait time (average time from the start of the workflow to the time for starting to process the job). On the other hand, the application information is different among the applications used in the workflow. For example, in the case of scan, it includes color information, image resolution, compression method and stored site. In the case of optical character recognition, it includes image embedding, file of an object of the optical character recognition, and stored site. In the case of registration to a web server, it includes file to be registered and stored site. In the case of print, it includes color information, output resolution, and double-sided print. In the case of binding of a sentence in a predetermined form, it includes the predetermined form.

In a workflow shown in FIG. 7, following jobs are executed successively.
(A) Scan a document at the multifunctional peripheral 12 (MFP1), convert the image data obtained by the scan to an electronic file, and send it to the server apparatus 16 (Server01).
(B) Execute optical character recognition (OCR) on the image data received at the server apparatus 16 (Server01) and embeds the image (characters) in the electronic file.
(C) Upload the image data to the web server in the server apparatus 18 (Server01). Thus, people in the relevant section can see the image data as an electronic text file.

Figure 8:
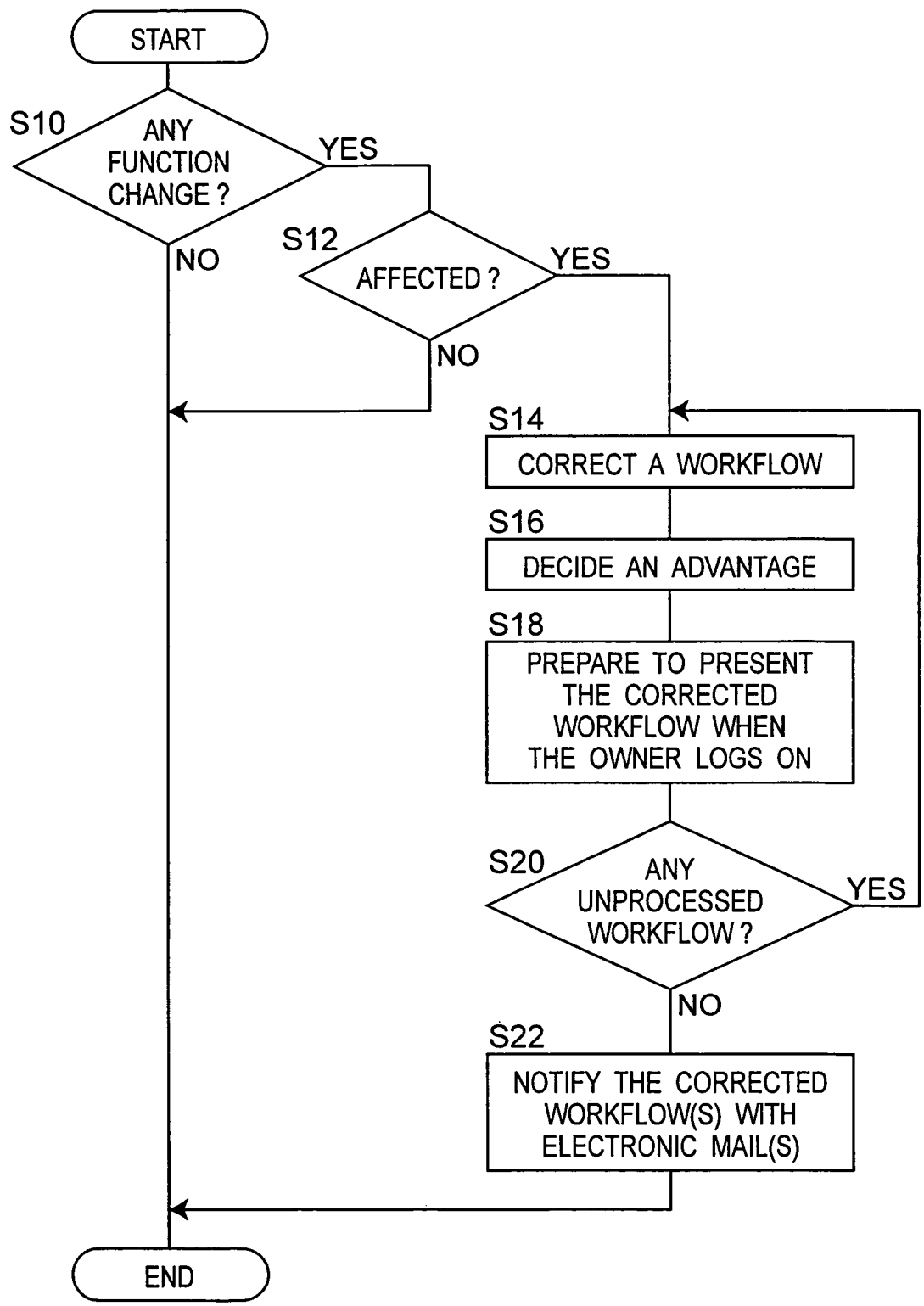
FIG. 8 is a flowchart for correcting a workflow.

Next, a processing on the detected function change is explained. ?? For example, when a function provided in a device is improved, or when a new function is added to the device, the workflow under management is checked on improvement such as reconstruction or optimization and presents an improved plan if it is decided to have an advantage for the user. FIG. 8 shows a flowchart of a processing for a workflow. First, it is decided whether any function of the multifunctional peripheral is changed or not (S10). This step corresponds to the function change detector 52 shown in FIG. 3. Next, it is decided whether there is any workflow affected by the function change (S12). In the concrete, the function on which the change is detected at step S10 is compared with the functions used in the jobs in the workflows managed by the workflow manager 50, and it is confirmed whether the function is used or a different function related to the function is used. Thus, workflows affected by the function change are detected. If there is any workflow affected by the function change, the workflow is corrected or reconstructed by taking the function change into account (S14). In the concrete, the workflows are corrected to use the changed function. Next, an advantage such as the processing time and the cost of the workflow due to the correction is estimated (S16). The advantage includes, for example, decrease in processing time, reduction in hardware resources, improvement of quality such as resolution or color correction of a print, or improvement of conveniences of user (availability to use a plurality of MFPs). The color correction includes version upgrade of color matching profile, edge emphasis or smoothing. If the corrected workflow is decided to have an advantage, it is prepared to present the corrected workflow when the user having the workflow logs on (S18). Then the flow returns to step S16, and the above-mentioned processing is repeated on a workflow not yet processed. When there remains no workflow to be processed (NO at S20), the corrected workflow or workflows are notified to the owner or owners thereof with an electronic mail or mails (S22), and the flow is completed. It is to be noted that the timing of the presentation may be just after the function change is detected. If a return mail from the user is not received, the corrected workflow can be presented when the user logs on to the multifunctional peripheral.

Instead of the notification with an electronic mail at step S22, the corrected workflow can be presented in a popup window in the operation panel 44 when the user logs on. FIG. 9 is a flowchart of a processing for presenting a corrected workflow. When a log-on is detected (S30), it is checked whether a user for whom a corrected workflow has to be presented logs on or not (S32). If so, it is decided whether the corrected workflow has already been notified with an electronic mail or not (S34). If not yet notified, it is further decided whether a confirmation mail for accepting or not the notified correction of workflow has been received or not (S36). If the confirmation mail is not yet received or the user has not yet confirmed it, or if an electronic mail for confirmation has not yet been sent, the corrected workflow is presented to the user with a popup window (S38). If the corrected workflow is accepted by the user (YES at S40), it is stored (S42). Then, the flow proceeds to a different processing (S44).

An example of correction of a workflow is explained here. In a first example, the workflow as shown in FIG. 7 is stored in MFP 12. In the workflow:
(A) Scan a document at the multifunctional peripheral 12 (MFP1).
(B) Convert the image data obtained by the scan to an electronic file, and send it to the server apparatus 16 (Server01).
(C) Perform optical character recognition (OCR) on the image data received at the server apparatus 16 (Server01), and embeds the image (characters) in the electronic file.
(D) Upload the image data to the web server in the server apparatus 18 (Server01).

It is assumed here that a function of optical character recognition (OCR) is added as an option to the multifunctional peripheral 12. In a current workflow the OCR function is performed in the server apparatus 16, but it can also be performed in multifunctional peripheral 12. If it is decided that the OCR operation in the multifunctional peripheral 12 shortens the processing time due to decrease in burden of transmission to the server apparatus 16, it is proposed to improve the workflow to the user or the administrator of the workflow.

FIG. 10 shows a workflow to be presented to a user. In this workflow:
(A) Scan a document at the multifunctional peripheral 12 (MFP1), and convert the image data obtained by the scan to an electronic file.
(B) Perform optical character recognition (OCR) on the image data at the multifunctional peripheral 12, and embeds the image (characters) in the electronic file.
(C) Upload the image data to the web server in the server apparatus 18 (Server01).

In this workflow, the processing time is 38.5 seconds much shorter than 53.5 seconds of the current workflow.

In a second example, a workflow as shown in FIG. 11 is stored in the multifunctional peripheral 12. In this workflow:
(A) Read a report (document) at the functional peripheral 12 (MFP1) by a user "A".
(B) Read a report (document) at the functional peripheral 12 by a user "B".
(C) Read a report (document) at the functional peripheral 12 by a user "C".
(D) When all the reports are prepared, create a document including a predetermined form and the three documents, and upload it to the server apparatus 16 (Server01).

It is assumed here that another multifunctional peripheral 14 (MFP2) is added newly. Previously, only the multifunctional peripheral 12 was used, but now the multifunctional peripheral 14 can also read a document in a workflow. Then if it is decided that the user's convenience is improved or the average wait time is improved, it is proposed to the user or the administrator of the workflow to improve the workflow.

Figure 12:
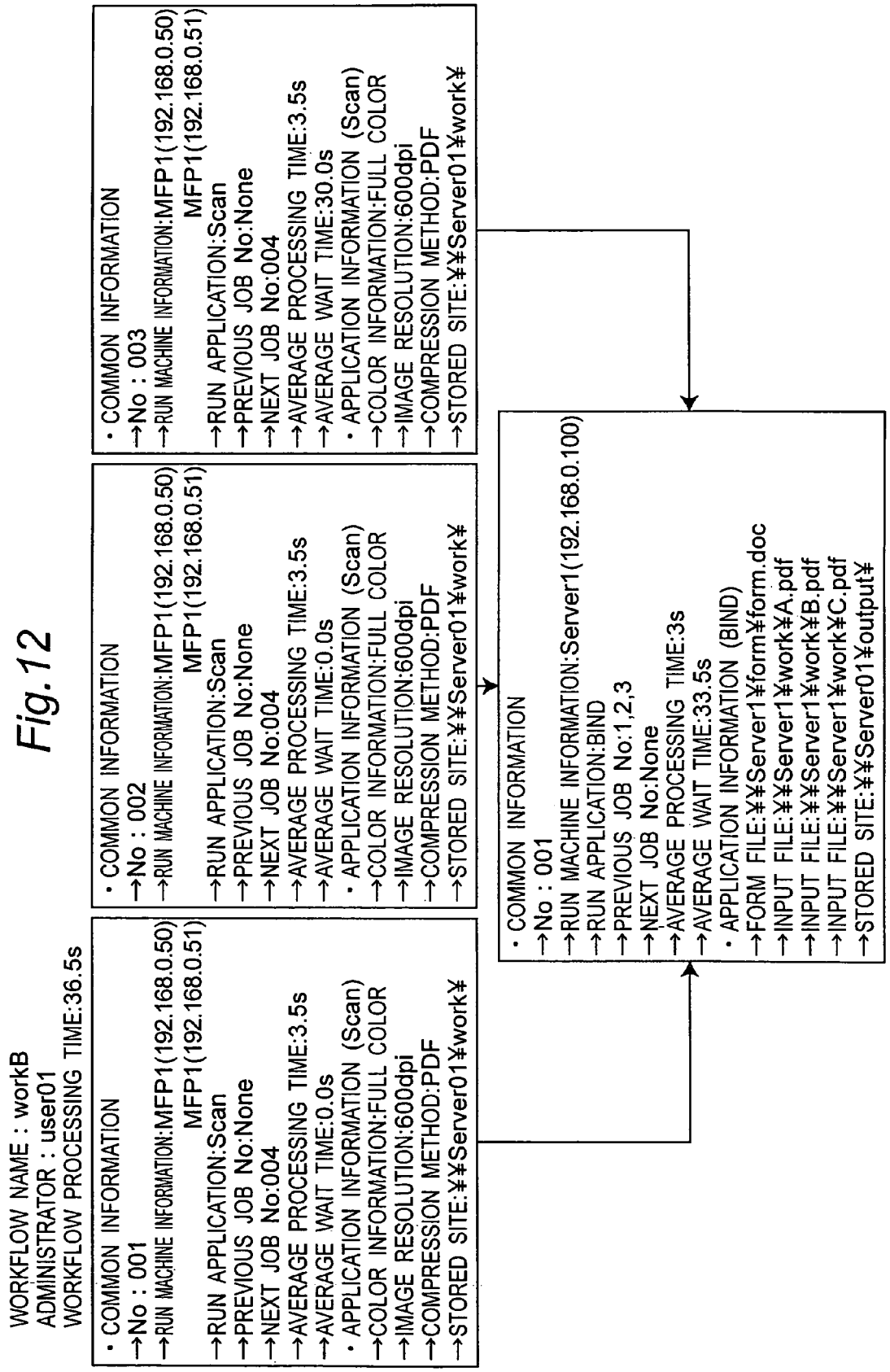
FIG. 12 is a diagram of a different example of a workflow to be presented to a user.

FIG. 12 shows a workflow to be presented to a user. In this workflow,
(A) Read a report (document) at the functional peripheral 12 (MFP1) or 14 (MFP2) by a user "A".
(B) Read a report (document) at the functional peripheral 12 or 14 by a user "B".

(C) Read a report (document) at the functional peripheral 12 or 14 by a user "C".

(D) Send the reports read at the functional peripheral 14 to the functional peripheral 12.

(E) When all the reports are prepared, create a document including a predetermined form and the three documents, and upload it to the server apparatus 16 (Server01).

In this example, the processing time is improved much from 93.5 to 36.5 seconds.

Figure 13:
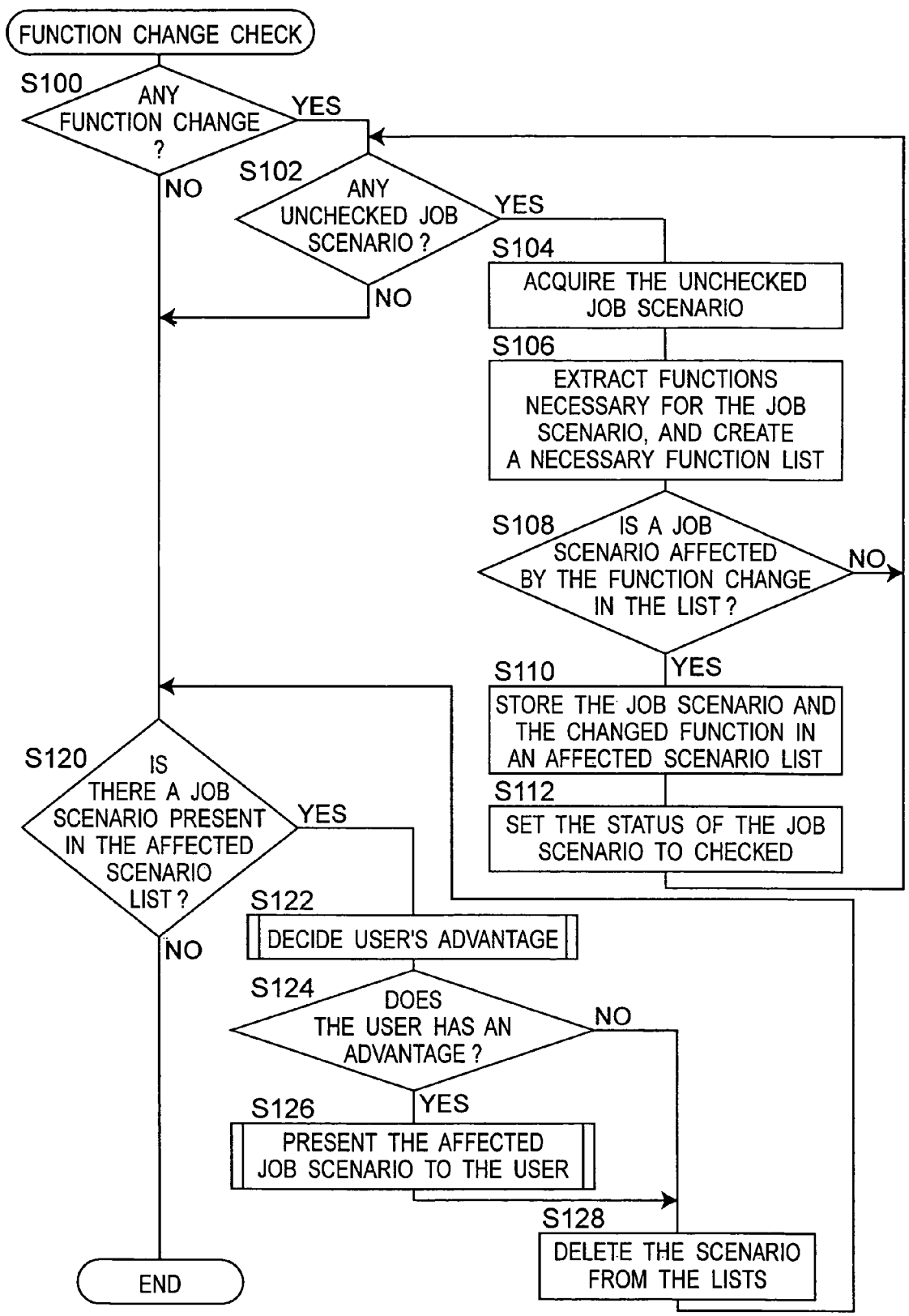
FIG. 13 is a flowchart for checking a function change.

FIG. 13 is a flowchart for processing when a function change is detected. When a function change is detected (YES at S100), if there remains a job scenario not yet checked (YES at S102), the job scenario is obtained (S104), and the functions necessary for the job scenario are extracted and are stored in a "list of necessary functions in job scenario" (S106). Next, it is checked whether the list includes a job scenario including the changed function or not (S108). If the list includes the changed function, the job scenario and the changed function are stored in an "affected scenario list" (S110), and the status of the job scenario is set to "checked" (S112). If there remains no job scenario not yet checked (NO at S102), the flow returns to step S102. The flow also returns to step S102 if the list does not include the changed function. When a function change is not detected (NO at S100), or when there remains no job scenario not yet checked (NO at S102), the flow proceeds to step S120.

Next, the job scenarios in the affected scenario list are presented to the user. First, if there is a job scenario in the affected scenario list (YES at S120), user's advantage is decided (S122, refer to FIG. 14). If it is decided that the user has an advantage (YES at S124), that is, if a corrected workflow of the affected scenario is present in the proposal workflow list, the corrected workflow is presented to the user (S126, refer to FIG. 15). Next, the job scenario is deleted from the affected scenario list and the proposal workflow list (S128), and the flow returns to step S120. When there is no job scenario in the affected scenario list (NO at S120), the flow is completed.

Figure 14:
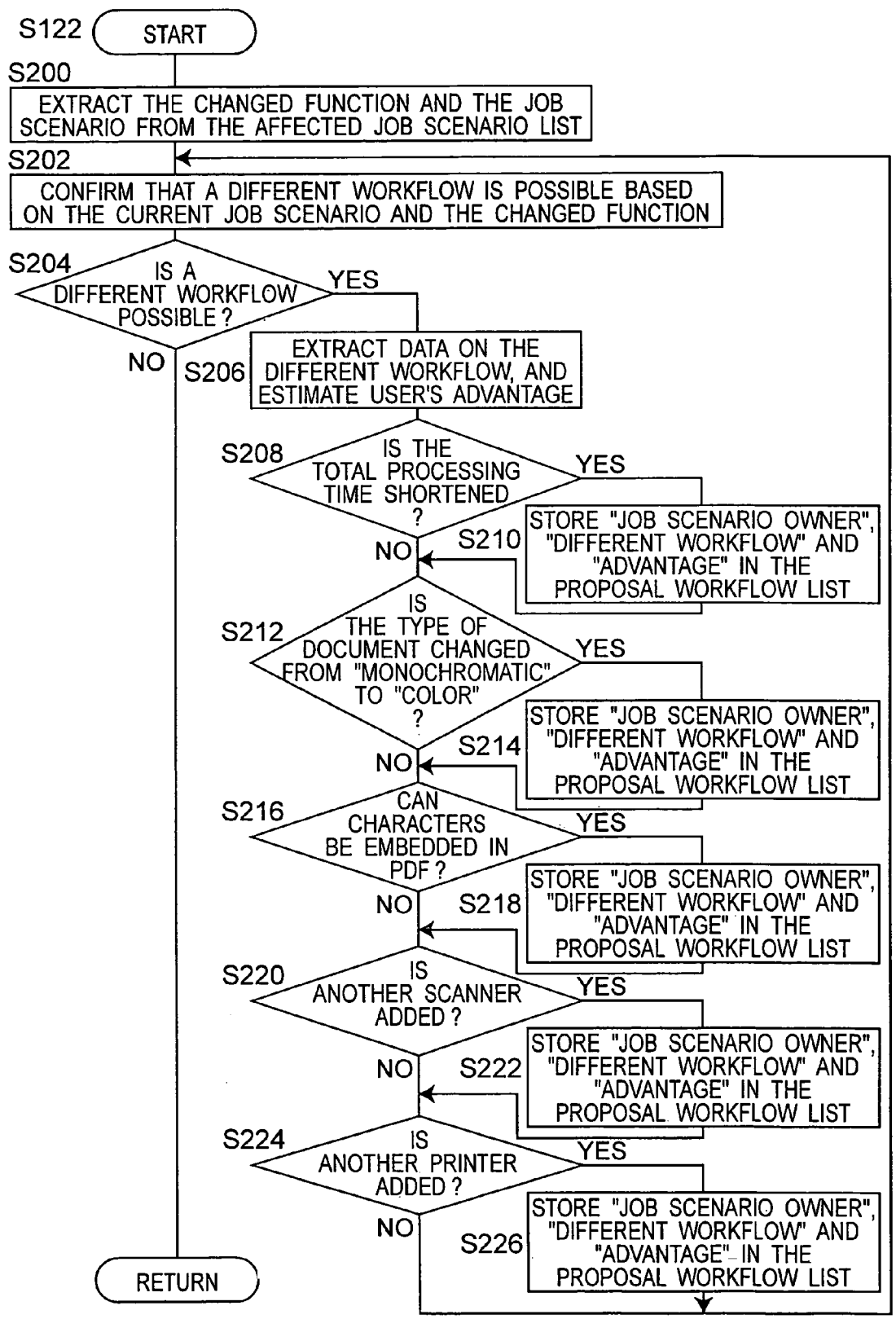
FIG. 14 is a flowchart for deciding user's advantage.

FIG. 14 is a flowchart of the estimation on the user's advantage (S122 in FIG. 13). First, the changed function and the job scenario are extracted from the affected scenario list (S200), and it is confirmed whether a different workflow is possible or not based on the current job scenario and the changed function (S202). If a different workflow is possible (YES at S204), data on the different workflow is extracted to check the user's advantage (S206). For example, if the total processing time can be shortened by correcting the current workflow to a corrected workflow, (S208), "job scenario owner", "different workflow" (or proposal workflow), and "advantage" are stored in the proposal workflow list of workflows (S210). If the document to be deal with is changed from monochromatic to color by correcting the current workflow to a corrected workflow (YES at S212), "job scenario owner", "different workflow" (or proposal workflow), and "advantage" are stored in the proposal workflow list (S214). If characters can be embedded in a file of portable document format (PDF) by correcting the current workflow to a corrected workflow (YES at S216), "job scenario owner", "different workflow" (or proposal workflow), and "advantage" are stored in the proposal workflow list of workflows (S218). If the number of scanners available for reading a document is increased by correcting the current workflow to a corrected workflow (YES at S220), "job scenario owner", "different workflow" (or proposal workflow), and "advantage" are stored in the proposal workflow list of workflows (S222). If the number of printers available is increased by correcting the current workflow to a corrected workflow (YES at S224), "job scenario owner", "different workflow" (or proposal workflow), and "advantage" are stored in the proposal workflow list of workflows (S226). Then the flow returns to step S202. If no different workflow is possible (NO at S204), this flow is completed. Thus scenarios having user's advantage are stored in the proposal workflow list.

Figure 15:
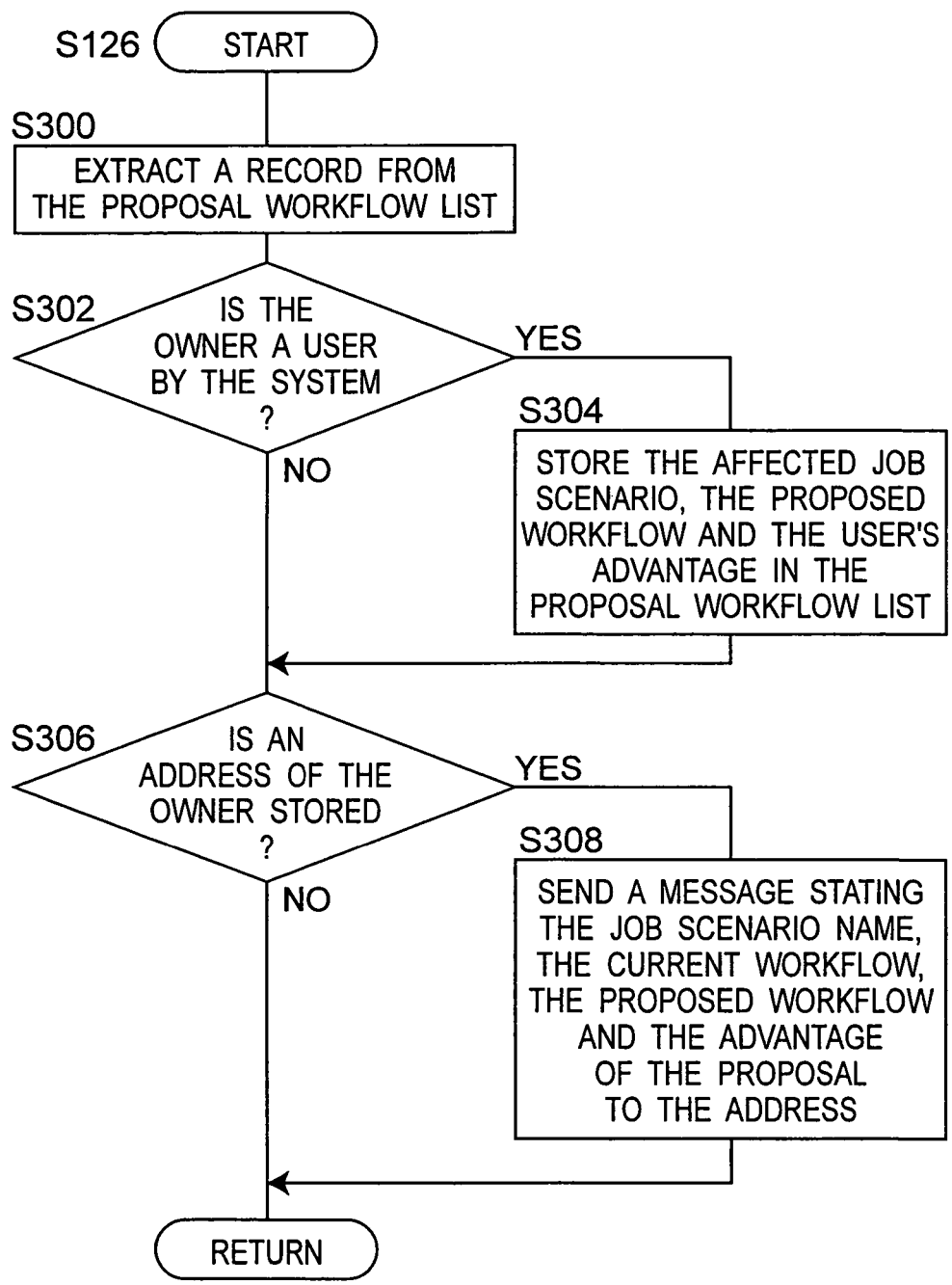
FIG. 15 is a flowchart for presenting an affected scenario to a user.

FIG. 15 is a flowchart for presenting affected scenarios to a user (S126 in FIG. 13), wherein a list for a user on job scenarios to be presented to the owner of the scenarios is created on the job scenarios in the proposal workflow list. First, a record in the "proposal workflow list" is extracted (S300). If the owner of the extracted job scenario is decided to be a user managed by the system of the multifunctional peripheral (YES at S302), the affected job list, the proposal workflow and the advantage on the correction are stored in the list of job scenarios for the user (S304). Even if the owner of the extracted job scenario is decided not to be a user managed by the system, but if an address of the user was stored when the job scenario was created (YES at S306), a notifying message stating the job scenario name, the workflow of the current job scenario, the proposal workflow and the advantage of the correction is sent to the address of the user (S308).

Figure 16:
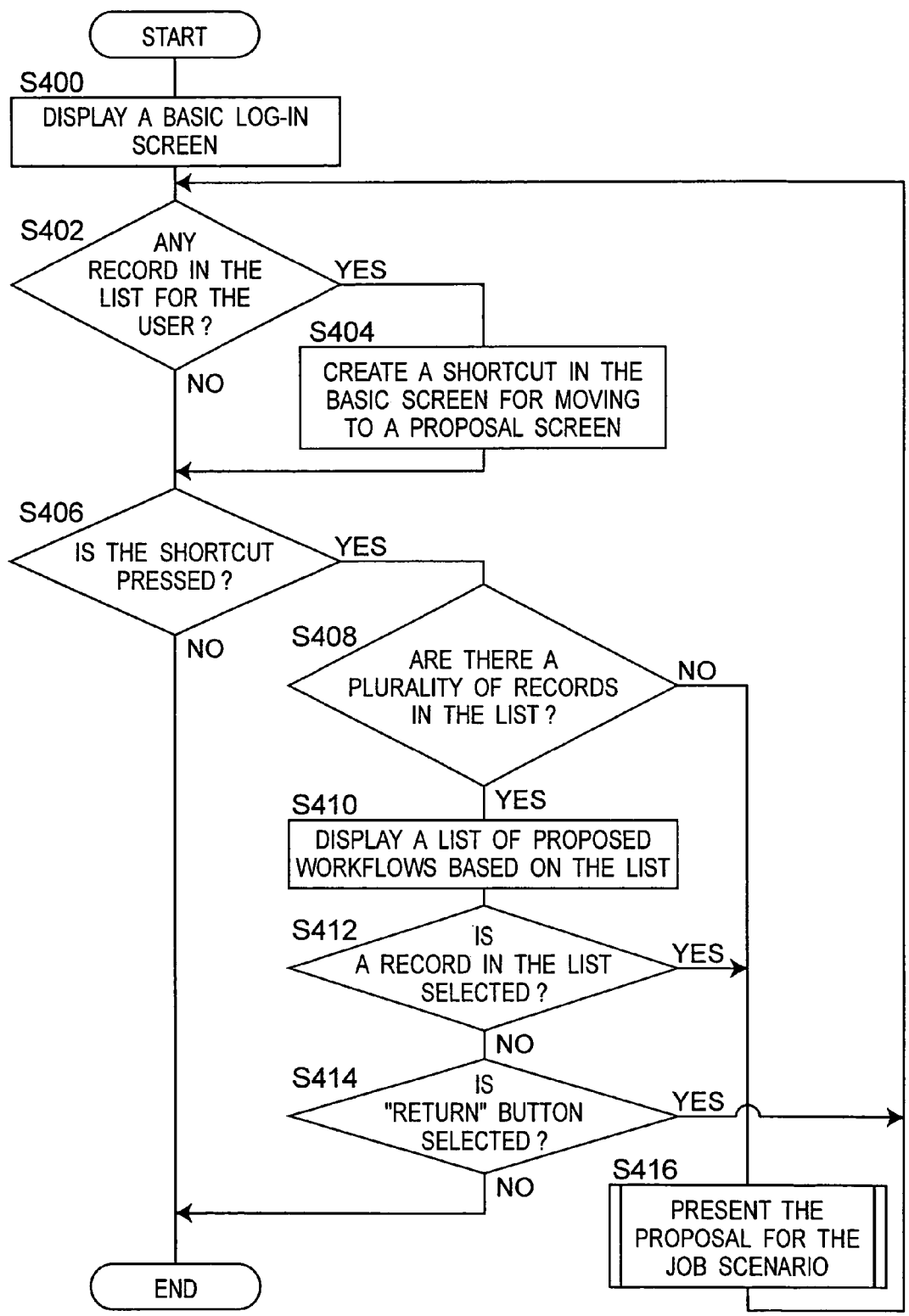
FIG. 16 is another flowchart for presenting affected scenario to a user.
Figure 17:
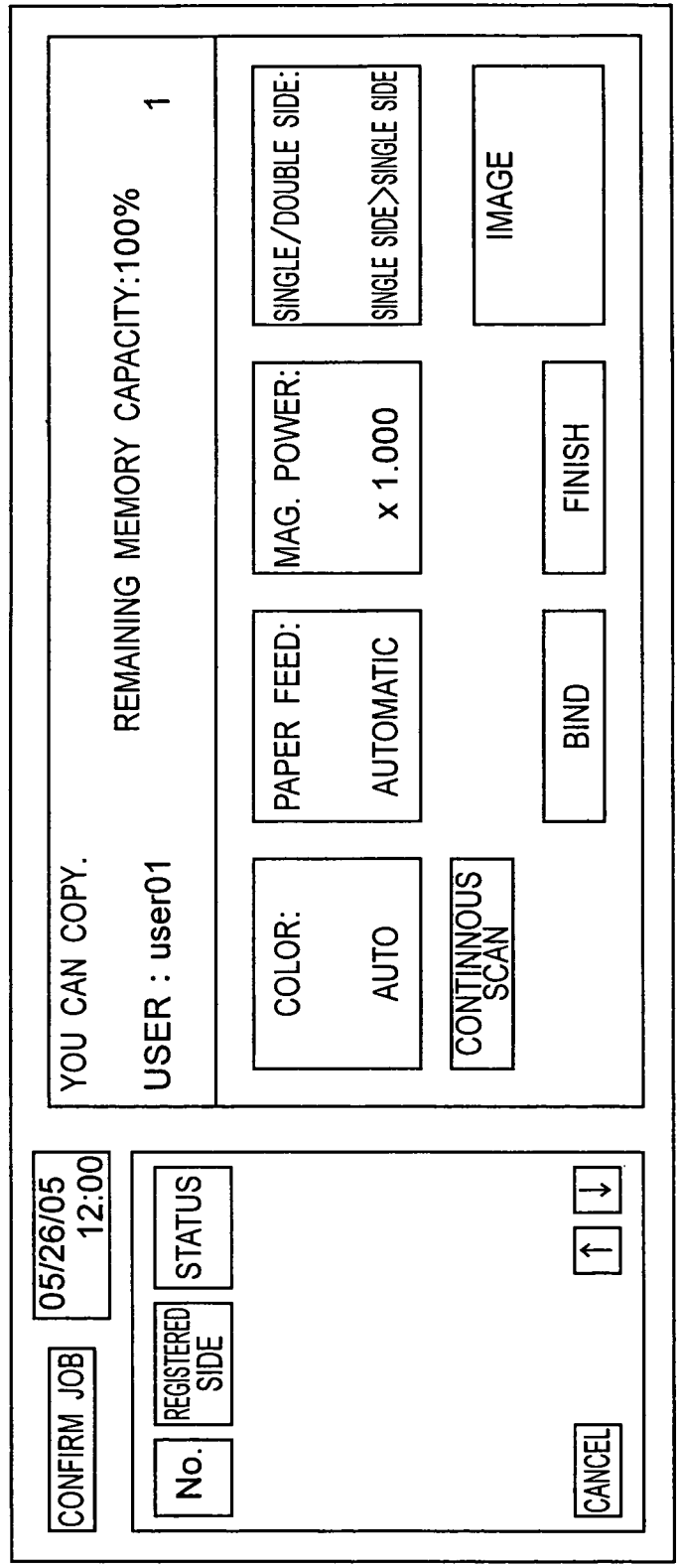
FIG. 17 is a diagram of a basic screen.
Figure 18:
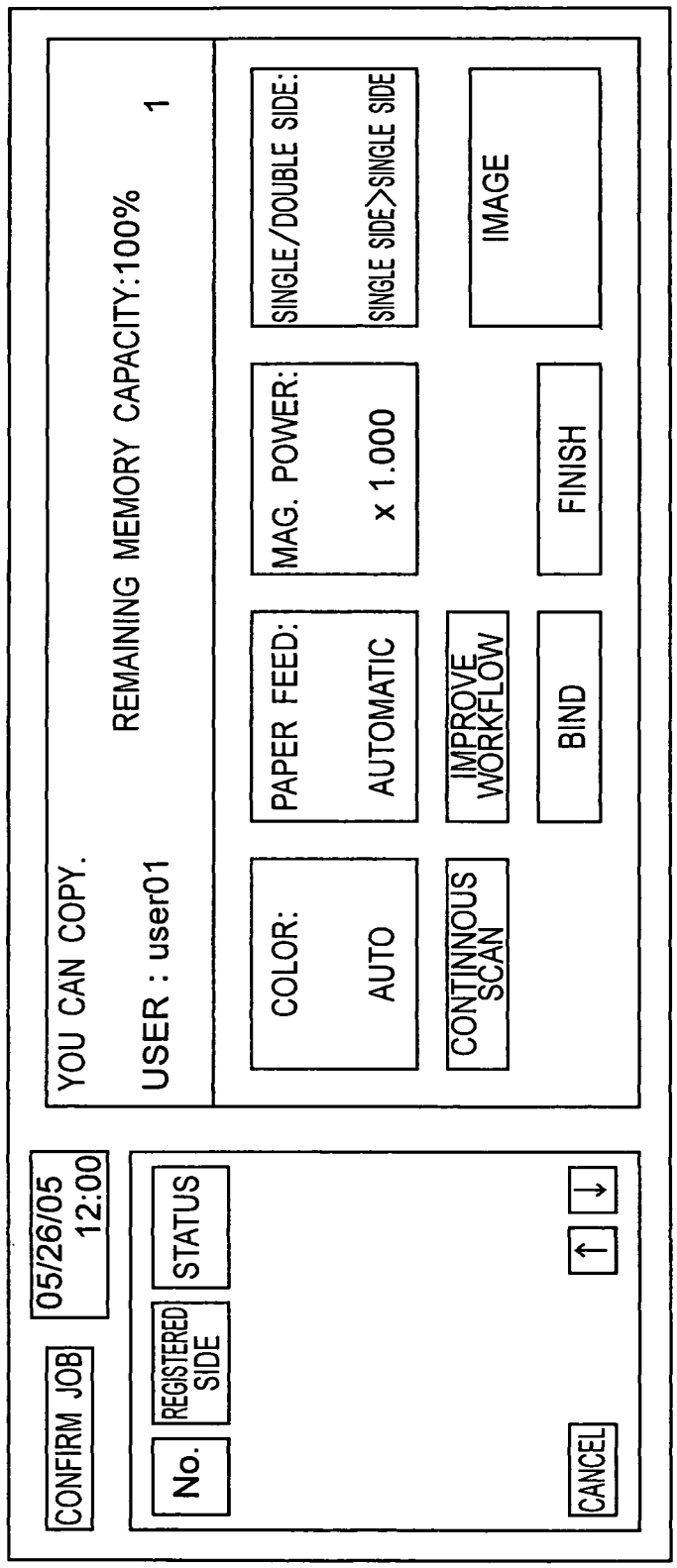
FIG. 18 is a diagram of a screen including a shortcut of "Improve workflow"
Figure 20:
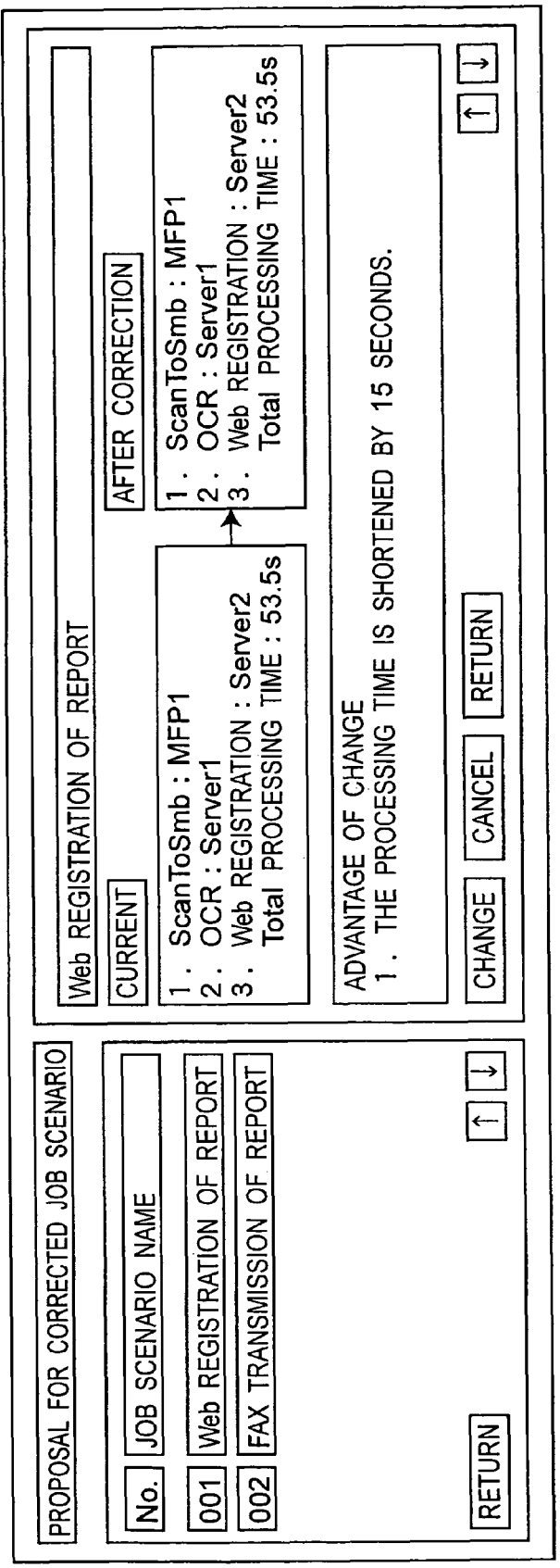
FIG. 20 is a diagram of a screen for presenting affected scenarios.

FIG. 16 is a flowchart for presenting the affected scenarios when a user logs in. It is assumed here that the user is an operator of the personal computer 20. First, a basic log-on screen (refer to FIG. 17) is displayed in the display device in the personal computer (S400). If there is a record in the list to the user (S402), a shortcut to a proposal screen for presenting corrected job scenarios is created and added to the basic screen (S404). In an example shown in FIG. 18, a shortcut having a name of "Improve workflow" is created. When the shortcut is pressed by the user (YES at S406), a list of proposed workflows is shown in the screen. First, it is decided whether there is a plurality of records in the list (S408). If there is a plurality of records, a list of proposed workflows is displayed in the display device, as shown in FIG. 19 (S410). When one of the records is selected (NO at S408, or YES at S412), the affected job scenario is presented in the screen (S416), and the flow returns to step S402. In an example shown in FIG. 20, on a workflow for registering a report to the web server, current and proposed workflows and the advantage of the correction are shown. When RETURN button is pressed (YES at S412), the flow returns to step S402, instead of the selection of a record. If no record is selected or RETURN button is not pressed, the flow is completed.

Figure 21:
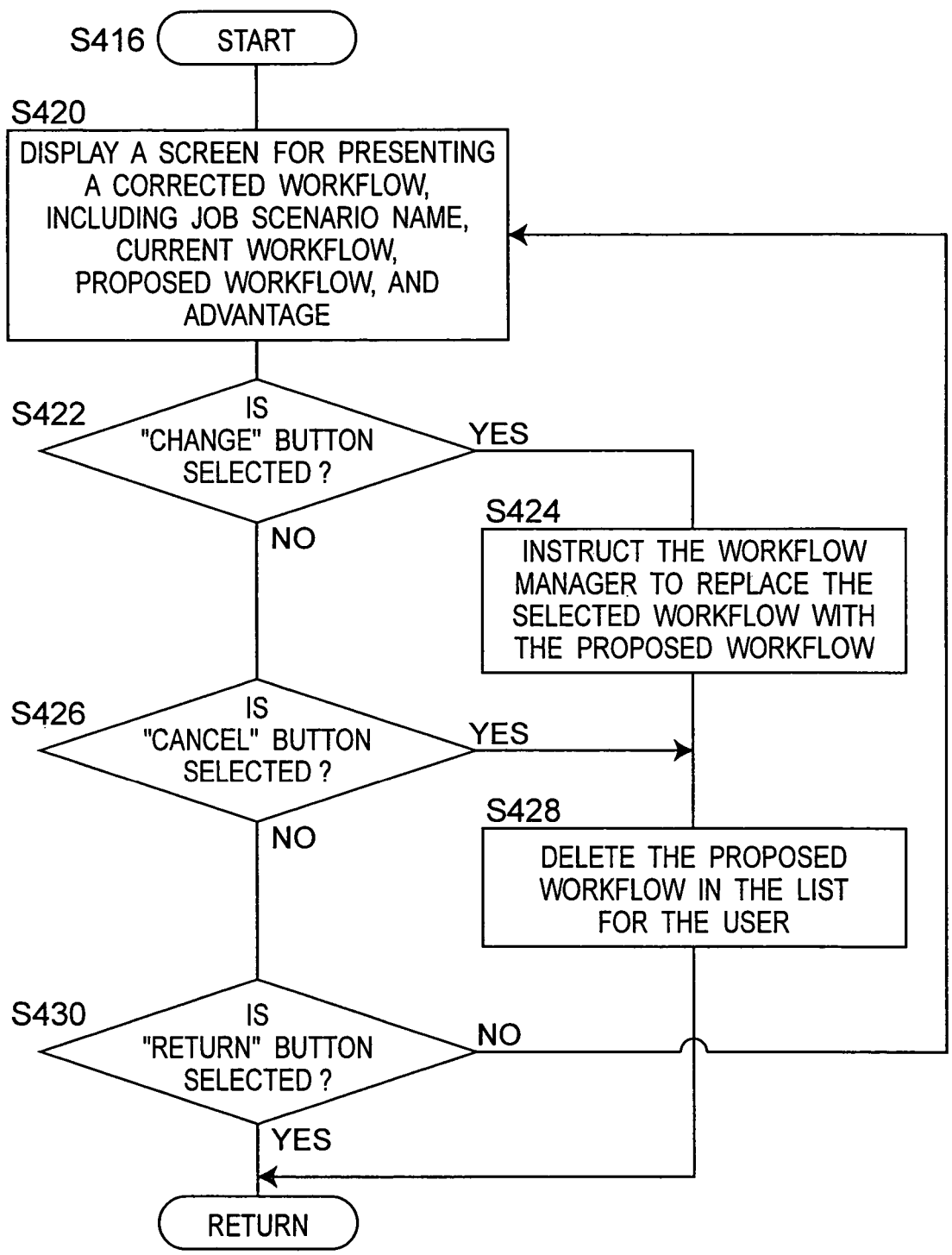
FIG. 21 is a flowchart of presentation of a corrected job scenario.

FIG. 21 shows a flowchart of presentation of a corrected job scenario (S416 in FIG. 16). First a screen for presenting a corrected job scenario is shown, wherein job scenario name, current workflow, proposed workflow and advantage of correction are displayed (S420). Next, when CHANGE button is selected (YES at S422), it is instructed to the workflow manager to replace the current workflow of the selected job scenario with the proposed workflow (S424). Then, the selected proposed workflow is deleted in the proposal workflow list (S428), and the flow is completed. When CANCEL button is pressed (YES at S426), the flow proceeds to step S428 to delete the selected workflow. When RETURN button is pressed (YES at S430), the flow is completed. If no button is selected, the flow returns to step S420.

Figure 22:
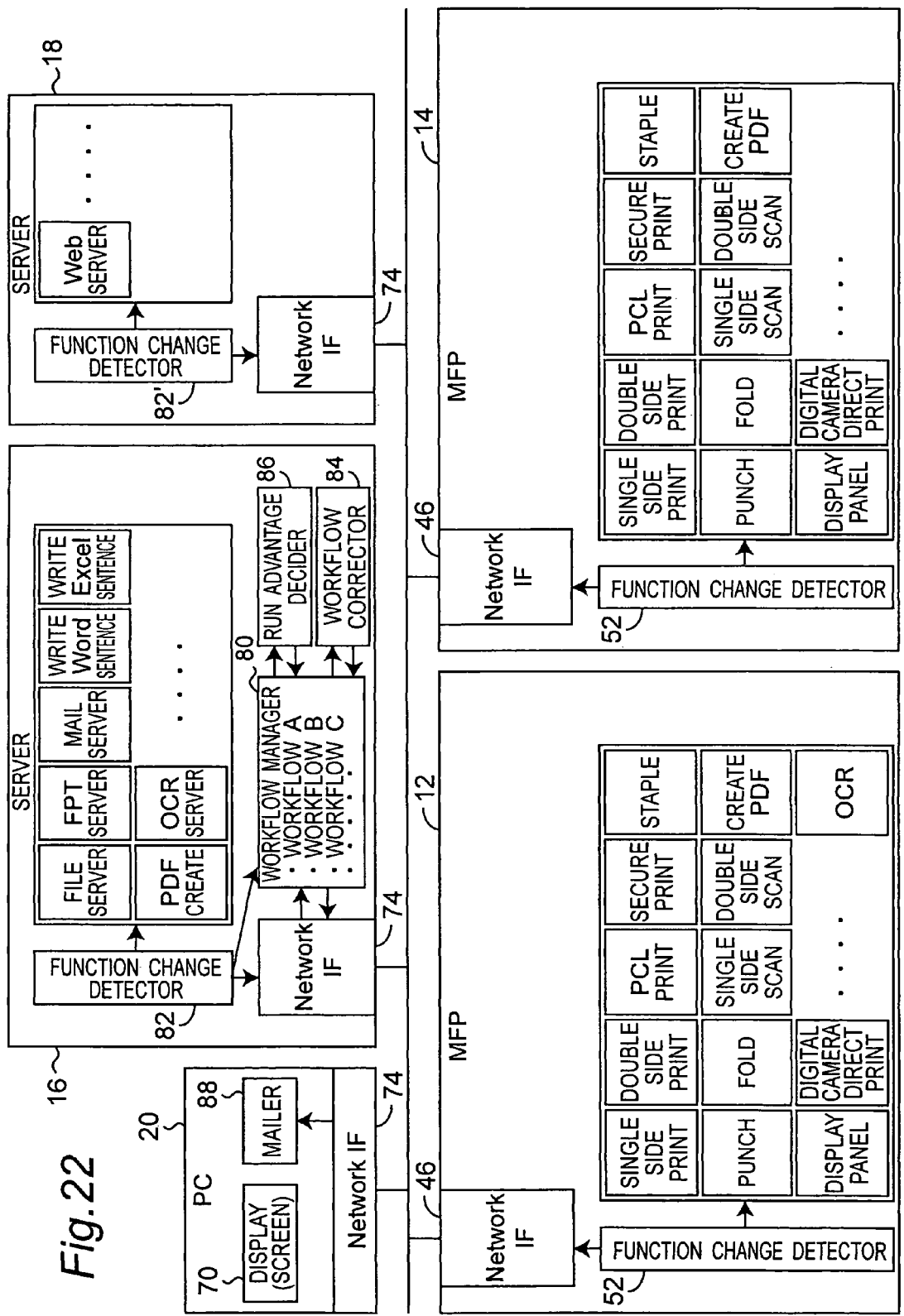
FIG. 22 is a control block diagram on workflow management in a network including multifunctional peripherals, server apparatuses and a personal computer in a modified embodiment.

In a modified example shown in FIG. 22, the server apparatus 16 manages the workflows used by the devices in the network. Only the server apparatus 16 has a workflow manager 80, a workflow corrector 84 and a run advantage decider 86. The multifunctional peripherals 12, 14 and the server apparatus 18 have a function change detector 52, and when a function change is detected, the function change detector 52 notifies it to the function detector 82 in the server apparatus 16. The workflow manager 80, the function detector 82, the workflow corrector 84 and the run advantage decider 86 have structures similar to the counterparts 50, 52, 56 and 58, and detailed explanation thereof is omitted here. Thus, when any function in the devices 12, 14 and 18 is changed, the function detector 82 in the server apparatus 16 receives notification of function change from the devices 12, 14 and 18 not including the workflow manager. When the notification is received, the workflow corrector 84 corrects workflows affected by the function change, and the run advantage decider 86 compares the corrected workflow with the current one to estimate user's advantage of the corrected one. The workflow manager 80 proposes the corrected workflow estimated to have user's advantage to the owner of the workflow.

Next, a different approach is explained when function change in a device is detected. In this approach, a workflow corrected according to a function change is stored. That is, when a function change of a device is detected, it is decided whether a workflow or workflows affected by the function change in the workflows under management can be corrected or reconstructed. If correction or reconstruction is decided possible, the corrected workflow is stored. Then, when the workflow is used next time, the corrected workflow can be used. Preferably, user's advantage on the corrected workflow is estimated, and when the user has the advantage, the corrected workflow is stored instead of the current workflow.

Figure 23:
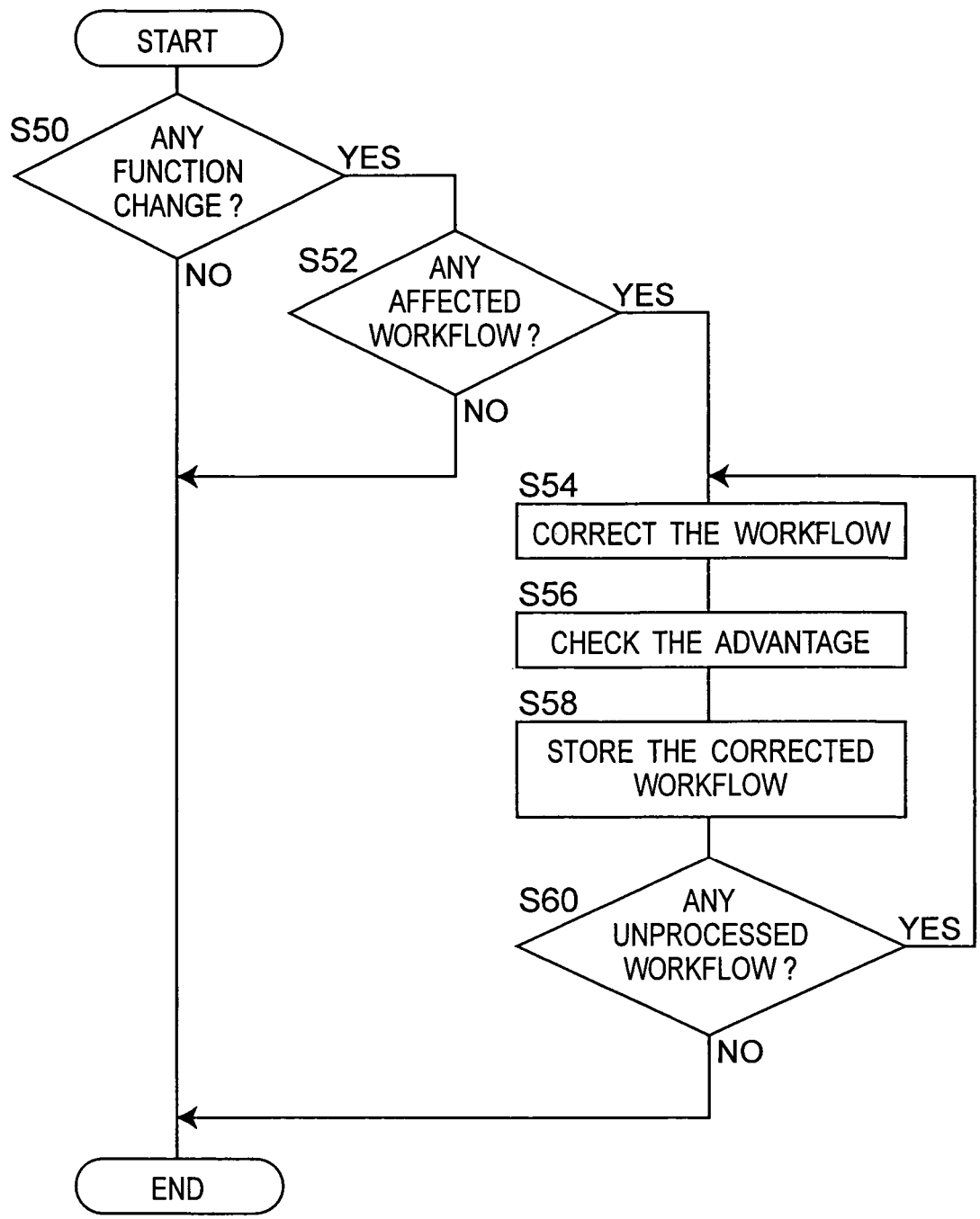
FIG. 23 is a flowchart of workflow processing in the modified embodiment.

FIG. 23 is a flowchart of workflow processing of the system controller 30. First, it is decided whether function change happens in a multifunctional peripheral (MFP) (S50). Next, it is decided on the stored workflows whether any workflow is affected by the function change (S52). If there is an affected workflow, it is corrected or reconstructed by considering the function change (S54). Next, the advantage on the processing time, cost or the like on the entire workflow by correcting the workflow is decided to be present or not (S56). The above steps are similar to the counterparts shown in FIG. 8. If the corrected workflow has the advantage, it is stored (S58). Then, the flow returns to step S54, and the above-mentioned steps are repeated on an unprocessed workflow. If there remains no unprocessed workflow (NO at S60), the flow is completed. When an owner of the corrected workflow logs on later, the corrected workflow will be presented to the user with a message that the workflow is reconstructed.

Preferably, as shown in the example in FIG. 8, an owner of a corrected workflow is requested to accept the correction. When the owner accepts it, the corrected workflow is stored. Needless to say, except this point, similar processing to the above-mentioned embodiment is possible.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A management apparatus for managing a flow of linked jobs to be executed by a plurality of devices comprising at least one multifunctional peripheral connected to a network, wherein the at least one multifunctional peripheral comprises:
a system controller;
a scanner operatively connected to the system controller;
an input image processor operatively connected to the scanner and to the system controller;
a network interface operatively connected to the system controller and to the network;
an output image processor operatively connected to the system controller;
a print engine operatively connected to the output image processor;
a memory operatively connected to the input image processor, the system controller, and the output image processor;
a storage device which has one or more flows stored therein and is operatively connected to the system controller;
a detector which detects an improvement of performance in an existing function of one or more of the devices, wherein the performance of said function by the device is already included in one of said one or more flows stored in said storage device;
a corrector which automatically corrects said one of the one or more flows stored in said storage device to include the improvement of performance in function detected by said detector to form a corrected flow;
an estimator which confirms each corrected flow is executable with a current job scenario being managed by the management apparatus and the changed function, estimates a plurality of advantages for each executable corrected flow over said at least one flow stored in said storage device, and associates the plurality of estimated advantages with the executable corrected flow;
wherein said storage device stores the corrected flow; and
wherein at least one of the advantages is an improvement of an average processing time and an average wait time, and another of the advantages is an improvement of quality of an output product or an improvement of user's convenience.

2. The management apparatus according to claim 1, wherein the at least one multifunctional peripheral further comprises:
a presenter which presents the corrected flow estimated to have the advantage over the current flow to a user who owns the current flow, before storing the corrected flow in said storage device.

3. The management apparatus according to claim 1, wherein said storage device has an acceptor for receiving acceptance from the user, wherein said storage device stores the corrected flow when said acceptor receives acceptance by the user.

4. The management apparatus according to claim 1, wherein the management apparatus is equipped in each of at least two of the devices connected to the network, wherein when said detector in the management apparatus detects the improvement of performance in function, the management apparatus notifies the improvement of performance in function to a counterpart management apparatus or apparatuses in the at least two of the devices.

5. The management apparatus according to claim 1, wherein the management apparatus is equipped only in one of the devices, and the management apparatus receives a notification of the improvement of performance in function, which is detected by one or more devices in the plurality of devices wherein the management apparatus is not equipped.

6. The management apparatus according to claim 1, wherein the detector detects the improvement of performance in the existing functions of the one or more of the devices by comparing performance of current functions of the one or more of the devices with performance of the existing functions already included in one of said one or more flows stored in said storage device.

7. A management apparatus for managing a flow of linked jobs to be executed by a plurality of devices connected to a network comprising at least one multifunctional peripheral, wherein said multifunctional peripheral comprises:
- a system controller;
- a scanner operatively connected to the system controller;
- an input image processor operatively connected to the scanner and to the system controller;
- a network interface operatively connected to the system controller and to the network;
- an output image processor operatively connected to the system controller;
- a print engine operatively connected to the output image processor;
- a memory operatively connected to the input image processor, the system controller, and the output image processor;
- a storage device which has one or more flows stored therein and is operatively connected to the system controller;
- a detector which detects an improvement of performance in an existing function of one or more of the devices, wherein the performance of said function by the device is already included in one of said one or more flows stored in said storage device;
- a corrector which automatically corrects said one of the one or more flows stored in said storage device to include the improvement of performance in function detected by said detector to form a corrected flow;
- an estimator which confirms each corrected flow is executable with a current job scenario being managed by the management apparatus and the changed function, estimates a plurality of advantages for each corrected flow over said at least one flow stored in said storage device, and associates the plurality of estimated advantages with the executable corrected flow;
- wherein at least one of the advantages is an improvement of an average processing time and an average wait time, and another of the advantages is an improvement of quality of an output product or an improvement of user's convenience; and
- a presenter which presents the corrected flow to a user who owns the one of the one or more flows.

8. The management apparatus according to claim 7, wherein said presenter presents the corrected flow estimated to have the advantage to the user.

9. The management apparatus according to claim 7, wherein the advantage is one of shortening of processing time or reduction of hardware resources.

10. The management apparatus according to claim 7, wherein said presenter notifies the flow estimated to have the advantage with an electronic mail to the user.

11. The management apparatus according to claim 7, wherein said presenter displays the corrected flow in a display device when the user logs on.

12. The management apparatus according to claim 7, wherein the detector detects the improvement of performance in the existing functions of the one or more of the devices by comparing performance of current functions of the one or more of the devices with performance of the existing functions already included in one of said one or more flows stored in said storage device.

13. A method for managing a flow of linked jobs to be executed by a plurality of devices connected to a network, wherein at least one of the devices is a multifunctional peripheral which comprises:
- a system controller;
- a scanner operatively connected to the system controller;
- an input image processor operatively connected to the scanner and to the system controller;
- a network interface operatively connected to the system controller and to the network;
- an output image processor operatively connected to the system controller;
- a print engine operatively connected to the output image processor;
- a memory operatively connected to the input image processor, the system controller, and the output image processor;
- a storage device which has one or more flows stored therein and is operatively connected to the system controller;

the method comprising:
- storing one or more flows in the storage device in said multifunctional peripheral;
- detecting an improvement of performance in an existing function of one or more of the plurality of devices, wherein the performance of said function by the device is already included in one of said one or more flows stored in said storage device;
- automatically correcting said one of the one or more flows stored in the storage device to include the detected improvement of performance in function to form a corrected flow;
- confirming each corrected flow is executable with a current job scenario managed by the method and the changed function;
- estimating a plurality of advantages for each executable corrected flow over said at least one flow stored in said storage device;
- associating the plurality of estimated advantages with the executable corrected flow; and
- storing the corrected flow in the storage device; and
- wherein at least one of the advantages is an improvement of an average processing time and an average wait time, and another of the advantages is an improvement of quality of an output product or an improvement of user's convenience.

14. The method according to claim 13, further comprising presenting the flow estimated to have the advantage to a user who owns the current workflow, before storing the corrected flow.

15. The method according to claim 13, wherein storing the corrected flow in the storage device comprises receiving acceptance from a user who owns the flow, and storing the corrected flow when acceptance by the user is received.

16. The method according to claim 13, wherein when the change of function is detected in a device in the plurality of devices, it is notified to other devices in the plurality of devices.

17. The method according to claim 13, wherein detecting the improvement of performance in the existing functions function of one or more of the plurality of devices comprises comparing performance of current functions of the one or more of the devices with performance of the existing functions already included in one of said one or more flows stored in said storage device.

* * * * *